United States Patent
Marschalkowski et al.

(10) Patent No.: US 12,262,289 B2
(45) Date of Patent: Mar. 25, 2025

(54) SYSTEMS, METHODS, AND DEVICES FOR UTILIZING RADAR WITH SMART DEVICES

(71) Applicant: Google LLC, Mountain View, CA (US)

(72) Inventors: Eric Marschalkowski, Inning By (DE); Brian Silverstein, San Carlos, CA (US); Eden Sherry, San Francisco, CA (US); Andrew Goldenson, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 372 days.

(21) Appl. No.: 17/584,653

(22) Filed: Jan. 26, 2022

(65) Prior Publication Data

US 2022/0225063 A1    Jul. 14, 2022

Related U.S. Application Data

(63) Continuation of application No. 17/002,655, filed on Aug. 25, 2020, now Pat. No. 11,272,335, which is a
(Continued)

(51) Int. Cl.
*H04W 4/33* (2018.01)
*G01S 7/00* (2006.01)
(Continued)

(52) U.S. Cl.
CPC ............... *H04W 4/33* (2018.02); *G01S 7/006* (2013.01); *G01S 13/42* (2013.01); *G01S 13/56* (2013.01);
(Continued)

(58) Field of Classification Search
None
See application file for complete search history.

(56) References Cited

U.S. PATENT DOCUMENTS 2,101,637 A    12/1937  Davis
3,681,603 A     8/1972  Scheidweiler et al.
(Continued)

FOREIGN PATENT DOCUMENTS

CN    101305248 A    11/2008
CN    101401008       4/2009
(Continued)

OTHER PUBLICATIONS

"Who We Are: Our Brands"; posted on the Internet at www.wi-fi.org by the Wi-Fi Alliance; no author indicated; copyright in the year 2024. (Year: 2024).*
(Continued)

*Primary Examiner* — Bernarr E Gregory
(74) *Attorney, Agent, or Firm* — Kilpatrick Townsend & Stockton LLP

(57) ABSTRACT

The various implementations described herein include methods, devices, and systems for determining locations of an electronic device. In one aspect, a method is performed at a computing system having one or more processors and memory. The method includes obtaining device identification information for the electronic device; broadcasting a request based on the device identification information that the electronic device be enabled to transmit or reflect location information using a radar technique; receiving a signal from the electronic device, the signal indicating a location of the electronic device using a radar technique; and determining the location of the electronic device based on the received signal.

20 Claims, 18 Drawing Sheets

Related U.S. Application Data continuation of application No. 15/485,127, filed on Apr. 11, 2017, now Pat. No. 10,798,539.

(60) Provisional application No. 62/455,449, filed on Feb. 6, 2017, provisional application No. 62/442,343, filed on Jan. 4, 2017, provisional application No. 62/438,397, filed on Dec. 22, 2016, provisional application No. 62/336,515, filed on May 13, 2016.

(51) Int. Cl.
*G01S 13/42* (2006.01)
*G01S 13/56* (2006.01)
*G01S 13/58* (2006.01)
*G01S 13/86* (2006.01)
*G01S 13/87* (2006.01)
*G01S 13/88* (2006.01)
*H04W 4/029* (2018.01)
*H04W 8/00* (2009.01)

(52) U.S. Cl.
CPC .............. *G01S 13/58* (2013.01); *G01S 13/86* (2013.01); *G01S 13/878* (2013.01); *G01S 13/88* (2013.01); *H04W 4/029* (2018.02); *H04W 8/005* (2013.01)

(56) References Cited

U.S. PATENT DOCUMENTS

| | | |
|---|---|---|
| 3,948,441 A | 4/1976 | Perkins et al. |
| 3,991,357 A | 11/1976 | Kaminski |
| 4,121,110 A | 10/1978 | Solomon |
| 4,157,506 A | 6/1979 | Spencer |
| 4,177,923 A | 12/1979 | Krump |
| 4,225,860 A | 9/1980 | Conforti |
| 4,249,696 A | 2/1981 | Donnelly et al. |
| 4,308,991 A | 1/1982 | Peinetti et al. |
| 4,319,234 A | 3/1982 | Rice |
| 4,460,125 A | 7/1984 | Barker et al. |
| 4,528,459 A | 7/1985 | Wiegel |
| 4,684,949 A | 8/1987 | Kalafus |
| 4,695,246 A | 9/1987 | Beilfuss et al. |
| 4,842,510 A | 6/1989 | Grunden |
| 4,845,474 A | 7/1989 | Moore et al. |
| 4,872,828 A | 10/1989 | Mierzwinski et al. |
| 4,898,229 A | 2/1990 | Brown et al. |
| 4,948,044 A | 8/1990 | Cacciatore |
| 4,955,805 A | 9/1990 | Ishiguro et al. |
| 4,955,806 A | 9/1990 | Grunden et al. |
| 5,107,918 A | 4/1992 | McFarlane et al. |
| 5,127,464 A | 7/1992 | Butler |
| 5,158,477 A | 10/1992 | Testa |
| 5,175,439 A | 12/1992 | Haerer et al. |
| 5,251,813 A | 10/1993 | Kniepkamp |
| 5,255,179 A | 10/1993 | Zekan et al. |
| 5,260,669 A | 11/1993 | Higgins et al. |
| 5,277,363 A | 1/1994 | Hart |
| 5,347,982 A | 9/1994 | Binzer et al. |
| 5,352,930 A | 10/1994 | Ratz |
| 5,381,950 A | 1/1995 | Aldridge |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,506,569 A | 4/1996 | Rowlette |
| 5,544,036 A | 8/1996 | Brown, Jr. et al. |
| 5,570,837 A | 11/1996 | Brown et al. |
| 5,589,824 A | 12/1996 | Lynch |
| 5,595,342 A | 1/1997 | McNair et al. |
| 5,611,484 A | 3/1997 | Uhrich |
| 5,635,896 A | 6/1997 | Tinsley et al. |
| 5,646,349 A | 7/1997 | Twigg et al. |
| 5,655,709 A | 8/1997 | Garnett et al. |
| 5,697,552 A | 12/1997 | McHugh et al. |
| 5,719,557 A | 2/1998 | Zuehlke |
| 5,808,294 A | 9/1998 | Neumann |
| 5,903,139 A | 5/1999 | Kompelien |
| 5,918,474 A | 7/1999 | Khanpara et al. |
| 5,959,568 A * | 9/1999 | Woolley ............... G01S 13/878 340/568.1 |
| 5,966,077 A | 10/1999 | Wong |
| 6,008,750 A | 12/1999 | Cottle |
| 6,060,719 A | 5/2000 | DiTucci et al. |
| 6,072,784 A | 6/2000 | Agrawal et al. |
| 6,084,518 A | 7/2000 | Jamieson |
| 6,084,522 A | 7/2000 | Addy |
| 6,089,310 A | 7/2000 | Toth et al. |
| 6,114,967 A | 9/2000 | Yousif |
| 6,213,404 B1 | 4/2001 | Dushane et al. |
| 6,218,995 B1 | 4/2001 | Higgins et al. |
| 6,222,719 B1 | 4/2001 | Kadah |
| 6,275,160 B1 | 8/2001 | Ha |
| 6,315,211 B1 | 11/2001 | Sartain et al. |
| 6,336,593 B1 | 1/2002 | Bhatnagar |
| 6,356,038 B2 | 3/2002 | Bishel |
| 6,377,182 B1 | 4/2002 | Devine et al. |
| 6,509,838 B1 | 1/2003 | Payne et al. |
| 6,513,723 B1 | 2/2003 | Mueller et al. |
| 6,566,768 B2 | 5/2003 | Zimmerman et al. |
| 6,619,055 B1 | 9/2003 | Addy |
| 6,622,925 B2 | 9/2003 | Carner et al. |
| 6,657,418 B2 | 12/2003 | Atherton |
| 6,743,010 B2 | 6/2004 | Bridgeman et al. |
| 6,778,091 B2 | 8/2004 | Qualey, III et al. |
| 6,794,771 B2 | 9/2004 | Orloff |
| 6,798,341 B1 | 9/2004 | Eckel et al. |
| 6,886,754 B2 | 5/2005 | Smith et al. |
| 6,956,463 B2 | 10/2005 | Crenella et al. |
| 6,965,313 B1 | 11/2005 | Saylor |
| 7,174,239 B2 | 2/2007 | Butler et al. |
| 7,200,467 B2 | 4/2007 | Schanin et al. |
| 7,342,493 B2 * | 3/2008 | Johnson ............... G01S 13/522 340/552 |
| 7,382,257 B2 | 6/2008 | Thomas et al. |
| 7,411,497 B2 | 8/2008 | Kates |
| 7,476,988 B2 | 1/2009 | Mulhouse et al. |
| 7,486,955 B2 | 2/2009 | Fukushima |
| 7,510,126 B2 | 3/2009 | Rossi et al. |
| 7,537,171 B2 | 5/2009 | Mueller et al. |
| 7,571,865 B2 | 8/2009 | Nicodem et al. |
| 7,579,945 B1 | 8/2009 | Richter et al. |
| 7,592,923 B2 | 9/2009 | Lax |
| 7,648,077 B2 | 1/2010 | Rossi et al. |
| 7,673,809 B2 | 3/2010 | Juntunen |
| 7,748,640 B2 | 7/2010 | Roher et al. |
| 7,755,220 B2 | 7/2010 | Sorg et al. |
| 7,775,452 B2 | 8/2010 | Shah et al. |
| 7,841,542 B1 | 11/2010 | Rosen |
| 7,900,849 B2 | 3/2011 | Barton et al. |
| 7,952,512 B1 * | 5/2011 | Delker ............... G01S 13/825 342/146 |
| 7,982,602 B2 | 7/2011 | Kates |
| 7,994,928 B2 | 8/2011 | Richmond |
| 8,016,205 B2 | 9/2011 | Drew |
| 8,091,375 B2 | 1/2012 | Crawford |
| 8,098,166 B2 | 1/2012 | Lang |
| 8,232,884 B2 | 7/2012 | Pattok et al. |
| 8,255,090 B2 | 8/2012 | Frader-Thompson et al. |
| 8,265,798 B2 | 9/2012 | Imes |
| 8,415,829 B2 | 4/2013 | Di Cristofaro |
| 8,706,270 B2 | 4/2014 | Fadell et al. |
| 8,752,711 B2 | 6/2014 | Campbell et al. |
| 8,942,274 B2 | 1/2015 | Thoukydides |
| 9,170,117 B1 | 10/2015 | Abuelsaad |
| 9,591,658 B2 | 3/2017 | Thoukydides |
| 10,157,524 B2 | 12/2018 | Blech |
| 10,613,213 B2 | 4/2020 | Silverstein et al. |
| 10,687,184 B2 | 6/2020 | Silverstein et al. |
| 10,721,384 B2 | 7/2020 | Schwager et al. |
| 10,798,539 B2 | 10/2020 | Marschalkowski et al. |
| 11,272,335 B2 * | 3/2022 | Marschalkowski ..... G01S 7/006 |

(56) References Cited

U.S. PATENT DOCUMENTS

| | | |
|---|---|---|
| 2002/0044061 A1 | 4/2002 | Johnson et al. |
| 2002/0063472 A1 | 5/2002 | Irvin |
| 2002/0074865 A1 | 6/2002 | Zimmerman et al. |
| 2003/0037555 A1 | 2/2003 | Street et al. |
| 2003/0064335 A1 | 4/2003 | Canon |
| 2003/0090243 A1 | 5/2003 | Atherton |
| 2003/0231001 A1 | 12/2003 | Bruning |
| 2004/0120084 A1 | 6/2004 | Readio et al. |
| 2004/0169587 A1 | 9/2004 | Washington |
| 2004/0192219 A1 | 9/2004 | Malone et al. |
| 2004/0209209 A1 | 10/2004 | Chodacki et al. |
| 2004/0245349 A1 | 12/2004 | Smith |
| 2005/0043907 A1 | 2/2005 | Eckel et al. |
| 2005/0145705 A1 | 7/2005 | Shah et al. |
| 2005/0170862 A1 | 8/2005 | Fukushima |
| 2005/0195757 A1 | 9/2005 | Kidder et al. |
| 2005/0212708 A1 | 9/2005 | Fifield |
| 2005/0215284 A1 | 9/2005 | Su et al. |
| 2005/0270151 A1 | 12/2005 | Winick |
| 2006/0014528 A9 | 1/2006 | Hsu et al. |
| 2006/0035657 A1 | 2/2006 | Lim |
| 2006/0102731 A1 | 5/2006 | Mueller et al. |
| 2006/0124759 A1 | 6/2006 | Rossi et al. |
| 2006/0132301 A1 | 6/2006 | Stilp |
| 2006/0133334 A1 | 6/2006 | Ross |
| 2006/0186214 A1 | 8/2006 | Simon et al. |
| 2006/0291483 A1 | 12/2006 | Sela |
| 2007/0045432 A1 | 3/2007 | Juntunen |
| 2007/0070961 A1 | 3/2007 | Tao |
| 2007/0095082 A1 | 5/2007 | Garrett et al. |
| 2007/0114848 A1 | 5/2007 | Mulhouse et al. |
| 2007/0115951 A1 | 5/2007 | Karaoguz et al. |
| 2007/0131787 A1 | 6/2007 | Rossi et al. |
| 2007/0218845 A1 | 9/2007 | Efland et al. |
| 2007/0228183 A1 | 10/2007 | Kennedy et al. |
| 2007/0229350 A1 | 10/2007 | Scalisi et al. |
| 2007/0241203 A1 | 10/2007 | Wagner et al. |
| 2007/0296280 A1 | 12/2007 | Sorg |
| 2008/0001734 A1 | 1/2008 | Stilp et al. |
| 2008/0015742 A1 | 1/2008 | Kulyk et al. |
| 2008/0042824 A1 | 2/2008 | Kates |
| 2008/0054082 A1 | 3/2008 | Evans et al. |
| 2008/0054084 A1 | 3/2008 | Olson |
| 2008/0094010 A1 | 4/2008 | Black |
| 2008/0133956 A1 | 6/2008 | Fadell |
| 2008/0147242 A1 | 6/2008 | Roher et al. |
| 2008/0211910 A1 | 9/2008 | Niem et al. |
| 2008/0219377 A1 | 9/2008 | Nisbet |
| 2009/0067670 A1 | 3/2009 | Johnson |
| 2009/0099697 A1 | 4/2009 | Li et al. |
| 2009/0140057 A1 | 6/2009 | Leen |
| 2009/0194601 A1 | 8/2009 | Flohr |
| 2009/0195349 A1 | 8/2009 | Frader-Thompson et al. |
| 2009/0201190 A1* | 8/2009 | Huthoefer ............... G01S 13/87 342/36 |
| 2009/0236433 A1 | 9/2009 | Mueller et al. |
| 2009/0241697 A1 | 10/2009 | Kato et al. |
| 2009/0248929 A1 | 10/2009 | Rofougaran |
| 2009/0259713 A1 | 10/2009 | Blumrich et al. |
| 2009/0323569 A1 | 12/2009 | Wentink |
| 2010/0006660 A1 | 1/2010 | Leen et al. |
| 2010/0053456 A1 | 3/2010 | Rowell |
| 2010/0070099 A1 | 3/2010 | Watson et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0127881 A1 | 5/2010 | Schechter et al. |
| 2010/0182743 A1 | 7/2010 | Roher |
| 2010/0193592 A1 | 8/2010 | Simon et al. |
| 2010/0220022 A1 | 9/2010 | Yoon et al. |
| 2010/0238036 A1 | 9/2010 | Holcombe |
| 2010/0254692 A1 | 10/2010 | Kurt et al. |
| 2010/0304770 A1 | 12/2010 | Wietfeldt et al. |
| 2010/0321244 A1* | 12/2010 | Kelly ............... G01S 5/04 342/465 |
| 2011/0012998 A1 | 1/2011 | Pan |
| 2011/0017863 A1 | 1/2011 | Goossen |
| 2011/0025257 A1 | 2/2011 | Weng |
| 2011/0045867 A1 | 2/2011 | Jeung et al. |
| 2011/0084161 A1 | 4/2011 | Wallis |
| 2011/0152024 A1 | 6/2011 | Kuehl |
| 2011/0215971 A1 | 9/2011 | Rao |
| 2011/0241624 A1 | 10/2011 | Park et al. |
| 2011/0253796 A1 | 10/2011 | Posa et al. |
| 2012/0017611 A1 | 1/2012 | Coffel et al. |
| 2012/0126019 A1 | 5/2012 | Warren et al. |
| 2012/0146796 A1 | 6/2012 | Margon et al. |
| 2012/0159023 A1 | 6/2012 | Rofougaran |
| 2012/0248211 A1 | 10/2012 | Warren et al. |
| 2012/0280900 A1 | 11/2012 | Wang et al. |
| 2012/0326912 A1 | 12/2012 | Aoyagi |
| 2013/0013975 A1 | 1/2013 | Yasufuku |
| 2013/0093594 A1 | 4/2013 | Brigham et al. |
| 2013/0176401 A1 | 7/2013 | Monari et al. |
| 2013/0263034 A1 | 10/2013 | Bruck |
| 2013/0265470 A1 | 10/2013 | Liu et al. |
| 2014/0006586 A1 | 1/2014 | Hong et al. |
| 2014/0013361 A1 | 1/2014 | Monari et al. |
| 2014/0020635 A1 | 1/2014 | Sayers |
| 2014/0028510 A1 | 1/2014 | Yoon et al. |
| 2014/0043496 A1 | 2/2014 | Azuma |
| 2014/0049480 A1 | 2/2014 | Rabii et al. |
| 2014/0084165 A1 | 3/2014 | Fadell et al. |
| 2014/0100773 A1 | 4/2014 | Cunningham |
| 2014/0118257 A1 | 5/2014 | Baldwin et al. |
| 2014/0155729 A1 | 6/2014 | Saitoh |
| 2014/0184890 A1 | 7/2014 | McKinley |
| 2014/0249692 A1 | 9/2014 | Levien |
| 2014/0279122 A1 | 9/2014 | Luna |
| 2014/0309789 A1 | 10/2014 | Ricci |
| 2014/0313067 A1 | 10/2014 | Hsiao et al. |
| 2014/0324410 A1 | 10/2014 | Mathews et al. |
| 2014/0347478 A1 | 11/2014 | Cho et al. |
| 2014/0365304 A1 | 12/2014 | Showers et al. |
| 2015/0015713 A1 | 1/2015 | Wang et al. |
| 2015/0025708 A1 | 1/2015 | Anderson |
| 2015/0077282 A1* | 3/2015 | Mohamadi ............... G01S 13/74 342/450 |
| 2015/0096876 A1 | 4/2015 | Mittleman et al. |
| 2015/0120000 A1 | 4/2015 | Coffey |
| 2015/0237424 A1 | 8/2015 | Wilker et al. |
| 2015/0277569 A1 | 10/2015 | Sprenger et al. |
| 2015/0301031 A1 | 10/2015 | Zin et al. |
| 2015/0309602 A1 | 10/2015 | Katayama et al. |
| 2015/0350614 A1 | 12/2015 | Meier |
| 2016/0012730 A1 | 1/2016 | Jarrell |
| 2016/0041618 A1 | 2/2016 | Poupyrev |
| 2016/0098089 A1 | 4/2016 | Poupyrev |
| 2016/0109566 A1 | 4/2016 | Liu et al. |
| 2016/0189380 A1 | 6/2016 | Li et al. |
| 2016/0261793 A1 | 9/2016 | Sivan |
| 2016/0286169 A1 | 9/2016 | Sannala |
| 2016/0286607 A1 | 9/2016 | Mishra et al. |
| 2016/0337453 A1 | 11/2016 | Lee |
| 2017/0052618 A1 | 2/2017 | Lee |
| 2017/0097413 A1 | 4/2017 | Gillian |
| 2017/0139424 A1 | 5/2017 | Li |
| 2017/0285860 A1 | 10/2017 | Siddiq et al. |
| 2017/0285861 A1 | 10/2017 | Siddiq |
| 2017/0290011 A1 | 10/2017 | Kushnir et al. |
| 2019/0154843 A1 | 5/2019 | Kim |

FOREIGN PATENT DOCUMENTS

| | | |
|---|---|---|
| CN | 101522447 A | 9/2009 |
| CN | 101849311 A | 9/2010 |
| CN | 201717989 U | 1/2011 |
| CN | 101002399 B | 6/2011 |
| CN | 102684961 B | 2/2015 |
| EP | 0207295 A1 | 1/1987 |
| EP | 510807 A2 | 10/1992 |
| EP | 660287 A1 | 6/1995 |

(56) References Cited

FOREIGN PATENT DOCUMENTS

| | | |
|---|---|---|
| EP | 690363 A2 | 1/1996 |
| EP | 1 154 285 A2 | 11/2001 |
| EP | 1184804 A2 | 3/2002 |
| EP | 2302326 A1 | 3/2011 |
| EP | 2769275 A1 | 8/2014 |
| GB | 2294828 A | 5/1996 |
| JP | H9298780 A | 11/1997 |
| JP | 2000-338231 A | 12/2000 |
| JP | 2001-156676 A | 6/2001 |
| JP | 2005-17112 A | 1/2005 |
| JP | 2007-013709 A | 1/2007 |
| JP | 2007-019575 A | 1/2007 |
| JP | 2007064765 A | 3/2007 |
| JP | 2009-538720 A | 11/2009 |
| JP | 2010239398 A | 10/2010 |
| JP | 2011002873 A | 1/2011 |
| JP | 2011-099683 A | 5/2011 |
| JP | 2013-080689 A | 5/2013 |
| JP | 2015-072224 A | 4/2015 |
| JP | 2015532075 A | 11/2015 |
| TW | 535320 B | 6/2003 |
| TW | 200709529 A | 3/2007 |
| TW | 201232994 A | 8/2012 |
| WO | 2007/143535 A2 | 12/2007 |
| WO | 2008/020879 A2 | 2/2008 |
| WO | 2008/085200 A2 | 7/2008 |
| WO | 2010/044186 A1 | 4/2010 |
| WO | 2011/131938 A1 | 10/2011 |
| WO | 2012/068437 A2 | 5/2012 |
| WO | 2013/058820 A1 | 4/2013 |
| WO | 2014/047501 A1 | 3/2014 |
| WO | 2015/174879 A1 | 11/2015 |
| WO | 2016/053645 A1 | 4/2016 |

OTHER PUBLICATIONS

Sostanovsky et al., "Experimental UWB Sensing & Communication System," *IEEE A&E Systems Magazine*, Feb. 2006, 3 pages.

Roundy, "Energy Scavenging for Wireless Sensor Nodes with a Focus on Vibration to Electricity Conversion," Dissertion [online], retrieved from the Internet: <URL: http://users.cecs.anu.edu.au/Shad.Roundy/paper/ShadThesis.pdf>, Jun. 2003, 297 pages.

Wagner et al., "On Optimal Tag Placement for Indoor Localization," Mar. 19-23, 2012, 9 pages.

Notification of First Office Action for Chinese Application No. 201780011645.7 dated Sep. 24, 2021, all pages.

Office Action for European Application No. 17725046.1 dated May 17, 2021, all pages.

Detroitborg, Nest Learning Thermostat: Unboxing and Review, (online), retrieved from the Internet: URL: http://www.youtube.com/watch?v=KrgcOL4oLzc, retrieved on Aug. 22, 2013, Feb. 10, 2012, all pages.

First Action Interview Office Action Summary dated May 29, 2015 for U.S. Appl. No. 14/463,550, filed Aug. 19, 2014, all pages.

First Examination Report for India Appln No. 201847030068 dated Aug. 18, 2020, all pages.

International Search Report for PCT/US2017/031977 dated Aug. 8, 2017, all pages.

International Search Report and Written Opinion for PCT/US2013/061021 dated Feb. 20, 2014, all pages.

International Search Report and Written Opinion for PCT/US2014/022834 dated Jul. 14, 2014, all pages.

International Search Report and Written Opinion for PCT/US2012/030084 dated Jul. 6, 2012, all pages.

International Preliminary Report on Patentability for PCT/US2012/030084 dated Apr. 22, 2014, all pages.

International Search Report and Written Opinion for PCT/US2011/061344 dated Jun. 7, 2012, all pages.

International Preliminary Report on Patentability for PCT/US2011/061344 filed Nov. 18, 2011, all pages.

International Preliminary Report on Patentability for PCT/US2016/037401 dated Dec. 19, 2017, all pages.

Google LLC, Communication 161(1) and 162 EPC 16742443.1 dated Jan. 23, 2018, 1 page.

Google LLC, Communication EPC 16742443.1 dated Mar. 21, 2018, all pages.

Li Yiran et al., "Wireless Radar Devices for Smart Human-Computer Interaction," 2013 IEEE 56th International Midwest Symposium on Circuitsa and Systems, Aug. 3, 2014, 4 pages.

Pre-Interview Communication dated Feb. 27, 2015, for U.S. Appl. No. 14/457,492, all pages.

Rauchwammelder, Datasheet (online), GIRA (retrieved on Mar. 7, 2013). (retrieved from the internet: <URL: http://gira.de/gebaeudetechnik/produkte/sicherheit/rauchwarnmelderdualvds.html>; 4 pages.

SA720 Smoke Alarm User Manual, First Alert, Aug. 2007, 6 pages.

Weng et al., "400-MHz/2.4-GHz Combo WPAN Transceiver IC for simultaneous Dual-Band communication with one single antenna" (2018), 13 pages.

Zhang et al., A low complexity detector for Uplink Massive MIMO Systems Based on Gaussian Approximate Belief Propagation, 2015, 5 pages.

Decision of Rejection for CN 201780011645.7 dated Nov. 2, 2022, all pages.

U.S. Appl. No. 13/034,678, Non-Final Office Action dated Aug. 19, 2013, 9 pages.

U.S. Appl. No. 13/034,678, Notice of Allowance dated Feb. 4, 2014, 9 pages.

* cited by examiner

Electronic Tag 206

SYSTEMS, METHODS, AND DEVICES FOR UTILIZING RADAR WITH SMART DEVICES

CROSS-REFERENCES TO RELATED APPLICATIONS

The application is a continuation of U.S. patent application Ser. No. 17/002,655, filed Aug. 25, 2020, now U.S. Pat. No. 11,272,335, which is a continuation of U.S. patent application Ser. No. 15/485,127, filed Apr. 11, 2017, now U.S. Pat. No. 10,798,539, which claims priority to U.S. Provisional Application No. 62/336,515, filed May 13, 2016, entitled "Systems, Methods, and Devices for Utilizing Radar with Smart Devices," U.S. Provisional Application No. 62/442,343, filed Jan. 4, 2017, entitled "Systems, Methods, and Devices for Utilizing Radar with Smart Devices," U.S. Provisional Application No. 62/438,397, filed Dec. 22, 2016, entitled "Systems, Methods, and Devices for Utilizing Radar-based Touch Interfaces," and U.S. Provisional Application No. 62/455,449, filed Feb. 6, 2017, entitled "Systems, Methods, and Devices for Utilizing Radar with Smart Devices," each of which is hereby expressly incorporated by reference in its entirety.

TECHNICAL FIELD

This relates generally to radar technology, including but not limited to methods and systems for utilizing radar positioning data as a means of communication between smart devices.

BACKGROUND OF THE INVENTION

Devices in a smart home environment include a host of circuit components and interfaces for enabling communications with other systems, devices, and/or servers. Some smart devices include multiple radios within a compact area for receiving and transmitting signals on various wavelengths to other devices and across networks. For example, some smart devices gather information and/or communicate via radar.

BRIEF SUMMARY OF THE INVENTION

Accordingly, there is a need for methods, apparatuses, and systems for managing radar usage and communications. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to manage radar with smart devices. In one aspect, an electronic tag includes a first circuit configured to communicate with one or more other devices at a first frequency and a second circuit configured to communicate with the one or more other devices via radar.

Electronic tags are useful in tracking the location and movement of objects and entities. The tags can be configured to emit a unique radar signal, which is used by a control device to determine the location and/or movement of the tag. This allows the control device to better monitor the object or entity to which the tag is affixed. For example, a tag may be affixed to a door or window and configured to emit a radar signal in response to slight movement of the door/window. The control device receives the radar signal and uses the location and movement information to characterize the movement (e.g., determine whether the door/window is opening or closing). In security system implementations, the control device may generate an alert regarding the movement of the door or window. As another example the control device may detect a subtle movement of an object, such as a door or window, then request that a tag affixed to that object emit a radar signal. The control device can then use the signal from the tag to better characterize the subtle movement of the object.

Electronic tags may also be used to denote the boundaries for a monitored area. For example, a control device is set to monitor a particular apartment within an apartment complex. The use of electronic tags on walls, ceilings, and/or floors enables the control device to determine the boundaries of the apartment and disregard any activity detected beyond those boundaries.

In one aspect, a method is performed at a computing system (e.g., a control device) having one or more processors and memory. The method includes: (1) obtaining registration information for a plurality of electronic devices (e.g., electronic tags); (2) transmitting, via a first communication channel, a request based on the registration information that a particular electronic device of the plurality of electronic devices transmit via a radar channel; (3) receiving, via the radar channel, a signal from the particular electronic device; and (4) determining a location of the particular electronic device based on the received signal.

In another aspect, a method is performed at an electronic tag having one or more processors and memory. The method includes: (1) receiving, via a first communication channel, a request to transmit via a radar channel, the request comprising device identification information; (2) determining whether the received device identification information matches device identification information for the electronic tag, where the device identification information for the electronic tag is stored at the tag; and (3) in accordance with a determination that the received device identification information matches the device identification information for the electronic tag, causing a signal to be transmitted via the radar channel.

In some implementations, an electronic tag (also sometimes called a location tag or location beacon) is used to submit a unique signature to a radar subsystem. In some implementations, the signature is encoded by sending a unique signature on the same frequency band as the radar system.

Radar systems detect the presence, direction, distance, and/or speed of objects. Radar presents advantages over other detection systems, such as passive infrared (PIR) motion sensors. Radar systems detect a wide range of velocities and thus can differentiate between different objects in motion. For example, radar systems can distinguish between pets and persons in a home. In addition, radar systems can detect whether an object is moving toward the radar system or away (or tangential). Radar systems are capable of detecting minute human movements, such as a heartbeat. Also, in comparison to convention heat detection systems, it is more difficult to evade detection in a radar system. For example, a heavy winter coat may be sufficient to evade detection in some heat detection systems.

In regards to PIR sensors, generally radar systems can detect objects further away than PIR sensors. Moreover, radar systems do not need a lens and have a wider field of view than PIR sensors. Radar systems are generally less sensitive to heat than PIR sensors. For example, PIR sensors can trigger false positives due to heating, via sunlight or operation of surrounding components.

Radar systems are also capable of penetrating walls and other objects. Thus, a radar system can monitor multiple rooms in a dwelling and detect movement behind various objects in the dwelling. Therefore, radar systems are capable of communicating between rooms and through objects. Radar systems are also capable of detecting and interpreting particular gestures.

Unlike conventional camera systems, radar systems operate without regards to the level of visible light in a room or dwelling. In addition, radar systems can be configured to consume less power by adjusting a duty cycle and/or sending out brief pulses at set intervals.

A radar system may be one-dimensional (1D) or multi-dimensional. A one-dimensional radar consists of 1 transmitter and 1 receiver. A multi-dimensional radar includes a plurality of transmitters and/or a plurality of receivers (e.g., 3 transmitters and 4 receivers).

A radar system can be used for multiple purposes, including proximity detection, occupancy determinations, people counts, location determinations, single-person respiration monitoring, classification of motion events, multi-person respiration monitoring, single-person identification, and multi-person identification. For some purposes, such as proximity and/or single-person respiration monitoring, 1D radar systems can be as effective (or nearly as effective) as multi-dimensional radar systems. For other purposes, such as location determinations and multi-person respiration monitoring, multi-dimensional radar systems provide significantly more precision and/or accuracy. In some implementations, a plurality of 1D radar systems are networked together to provide precision and accuracy as good as, or better, than a single multi-dimensional radar system.

BRIEF DESCRIPTION OF TIE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION OF THE INVENTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
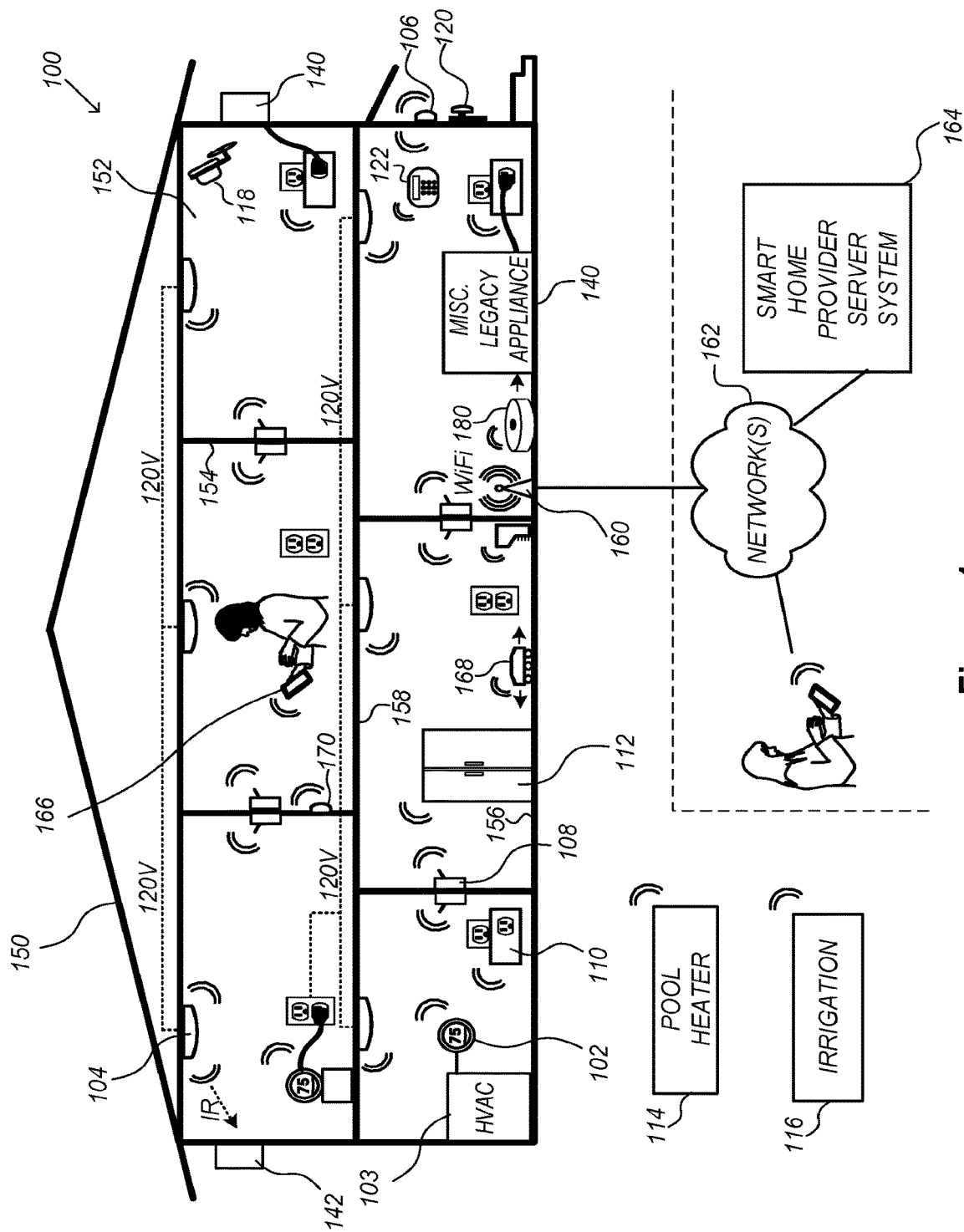
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, affixed to, integrated with and/or supported by a wall 154, floor 156 or ceiling 158. In some implementations, electronic tags are affixed to a wall 154, floor 156, ceiling 158, window, or door.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (e.g., "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (eg, receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). The cameras 118 optionally include one or more sensors (e.g., IR sensors, radar systems, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

In some implementations, the smart home environment 100 includes one or more electronic tags that are configured to communicate with one or more smart devices via radar. In some implementations, the electronic tags are affixed to an object such as a window, door, or wall and are configured to impart a radar signature for the object. In some implementations, the electronic tags are affixed to an entity, such as a pet, and are configured to impart a radar signature for the entity. In some implementations, the electronic tags are configured to communicate via multiple wavelengths and/or protocols. For example, a particular electronic tag is configured to communicate via RFID as well as via radar. In some implementations, a smart device, such as any of the smart devices discussed previously, includes a radar module for detecting the presence, direction, distance, and/or speed of objects, by sending out pulses of high-frequency electromagnetic waves that are reflected off the object back to the source. In some implementations, a smart device further includes a communications module, distinct from the radar module, for communicating with other smart devices and/or the electronic tags (e.g., via RFID, Wi-Fi®, Bluetooth®, and the like).

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi®, ZigBee®, 6LoWPAN, Thread®, Z-Wave®, Bluetooth Smart®, ISA100.11a, WirelessHART®, MiWi®, etc.) and/or any of a variety of custom or standard wired protocols (e.g., Ethernet®, HomePlug®, etc.), or any other suitable communication protocol, including communication protocols not yet developed as of the filing date of this document.

In some implementations, the smart devices communicate via radar positioning data. In some implementations, the smart devices communicate with one or more electronic tags via radar. In some implementations, the smart devices communicate with one another and/or with electronic tags using a plurality of communication channels, such as RFID, Wi-Fi®, Bluetooth®, and radar. As used herein, communicating via radar includes transmitting and analyzing positioning information. For example, a first device communicates via radar by modulating incoming radio signals in a predefined manner to produce one or more phantom velocities. A second device determines positioning of the first device (e.g., relative location and velocity) by analyzing the modulated signals (e.g., the phantom velocities) in accordance with radar positioning techniques (also sometimes called radar processing techniques). In some implementations, the radar positioning techniques include analyzing time-of-flight of radar signals, analyzing phase shift of the radar signals, and/or analyzing Doppler frequency shifts of the radar signals. In accordance with some implementations, the second device obtains a preset phantom velocity for the first device. The second device then processes the radar signals to: (1) identify the modulated signals from first device; (2) remove the preset phantom velocity from the modulated signals; and (3) identify the first device's relative location and velocity. In some implementations, the smart devices communicate via one or more radio frequency bands, such as 3-10 GHz, 24-24.5 GHz, 57-64 GHz, and/or 77-81 GHz. In some implementations, the smart devices utilize (e.g., temporarily repurpose) one or more existing radios for radar purposes. For example, the smart devices utilize radio(s) configured for Wi-Fi®, Bluetooth®, or the like, for radar positioning purposes. In some implementations, a smart device utilizes a particular radio for wireless communication implementing one or more communication protocols (e.g., Wi-Fi® or Bluetooth®) and for radar positioning purposes. In some implementations, the communicating via the radar channel comprises utilizing frequency modulated continuous wave (FMCW) radar, phase modulated continuous wave (PMCW) radar, step continuous wave radar, or the like.

In some implementations, the smart devices utilizing one or more other distancing technologies, such as Time-of-Arrival (TOA), Time-Difference-of-Arrival (TDOA), Received-Signal-Strength-Indication (RSSI), Near-Field-Electromagnetic-Ranging (NFER), and/or Angle-Of-Arrival (AOA). In some implementations, the smart devices utilize both radar system(s) and one or more of other distancing systems. In some implementations, the smart devices utilize one or more other distancing systems to perform the method(s) described herein with reference to radar systems.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee®, Z-Wave®, Insteon®, Bluetooth®, Wi-Fi® and other radio communication networks). In some implementations, the hub device 180 and devices coupled with/to the hub device can be controlled and/or interacted with via an application (sometimes called a smart home application) running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types-even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

Figure 7:
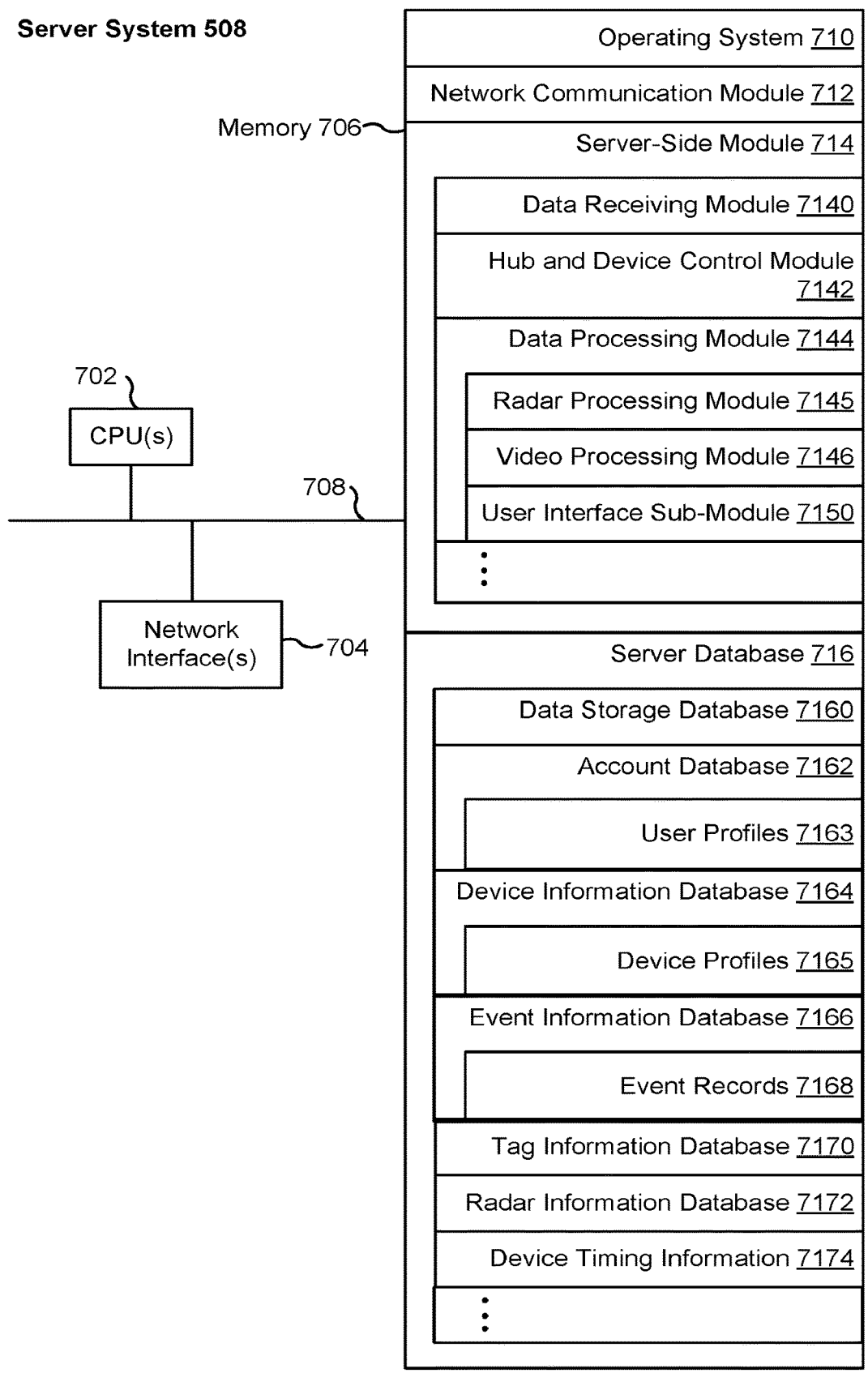
FIG. 7 is a block diagram illustrating a representative server system, in accordance with some implementations.

In some implementations, smart home environment 100 includes a local storage device for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system (e.g., server system 508, FIG. 5). In some implementations, the local storage device is a component of a camera device. In some implementations, each camera device includes a local storage. In some implementations, the local storage device performs some or all of the data processing described below with respect to server system 508 (FIG. 7). In some implementations, the local storage device stores some or all of the data described below with respect to server system 508, such as data storage database 7160, account database 7162, device information database 7164, and event information database 7166. In some implementations, the local storage device performs some or all of the operations described herein with respect to the server system 508.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings or other structures, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 2:
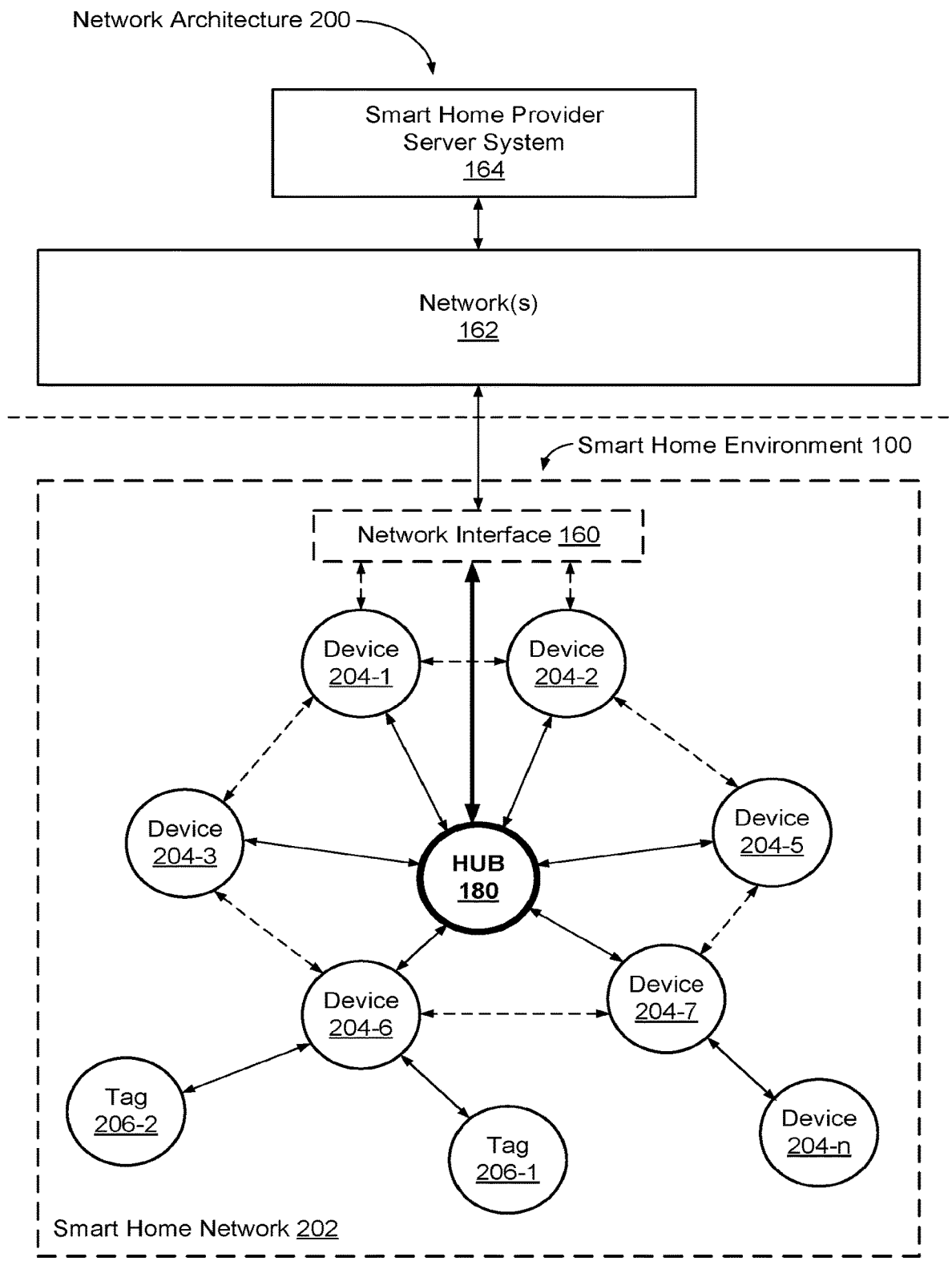
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally, and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee®, 6LoWPAN, radar, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee® chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 optionally send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment includes electronic tags 206, such as the electronic tag 206-1 and the electronic tag 206-2. In some implementations, the electronic tags 206 are low-power nodes in the smart home network 202. In some implementations, the electronic tags 206 are not connected to an external power source. In some implementations, the electronic tags 206 are battery-powered. In some implementations, an electronic tag (e.g., electronic tag 206-1) is capable of harvesting energy for use in operating the tag. For example, harvesting thermal, vibrational, electromagnetic, and/or solar energy received by the electronic tag.

In some implementations, electronic tags 206 are capable of "listening" on a first communication channel (e.g., an RFID channel), but not sending messages. In some implementations, electronic tags 206 are passive radar devices. Passive radar devices comprise radar devices that do not have a dedicated transmitter.

Passive radar devices include corner reflector devices and printed radar devices. Corner reflector devices are generally used to generate a strong radar echo from objects that would otherwise have only very low effective radar cross section (RCS). A corner reflector includes two or more electrically conductive surfaces that are mounted crosswise (e.g., at an angle of exactly 90 degrees). Incoming electromagnetic waves are backscattered by multiple reflection accurately in that direction from which they come. Thus, even small objects with small RCS yield a strong echo.

In some implementations, printed radar reflectors comprise simple aluminum fibers that form half-wave resonators within the object to be tracked (e.g., a piece of paper). The radar-reflecting fibers are approximately the same diameter as paper fibers (typically 6.5 mm long and 1.5 μm in diameter). Randomly oriented radar-reflecting fibers provide a unique backscatter pattern that can be read and stored in a database for future identification. Ordered patterns can also be designed so that individual resonators are coupled or decoupled, whatever is likely to give the optimum backscatter pattern. When illuminated with radar, the backscattered fields interact to create a unique interference pattern that enables one tagged object to be identified and differentiated from other tagged objects.

In some implementations, electronic tags 206 are active radar devices capable of transmitting radio frequency tones or pulses independent of any received waves. In various implementations, electronic tags 206 are capable of reflecting, amplifying, and/or modulating received radio waves. Active radar devices comprise single transistor devices, MEMS-based devices, and mechanical gated (shuttered) devices.

In some implementations, electronic tags 206 are configured to communicate via radar (e.g., cause positioning information to be transmitted) in response to enablement commands received via a communications channel (e.g., an RFID channel) from a smart device, such as smart device 204-6 in FIG. 2. In some implementations, electronic tags 206 are configured to communicate via radar at particular intervals, such as intervals preset by a smart device. For example, electronic tags 206-1 and 206-2 are configured by device 204-6 such that only one of the tags is communicating via radar at any given time. In some implementations, electronic tags 206 are configured to communicate via radar in response to detecting a change in the environment, such as motion of the object to which the electronic tag is affixed. For example, in some implementations, electronic tags 206 include one or more of: a humidity sensor; a temperature sensor; an accelerometer; a gyroscope; and/or an optical sensor. In this example, the tags are configured to communicate via radar in response to changes detected by one or more of the sensors.

In some implementations, the smart home environment 100 includes service robots 168 (FIG. 1) that are configured to carry out, in an autonomous manner, any of a variety of household tasks.

Figure 3:
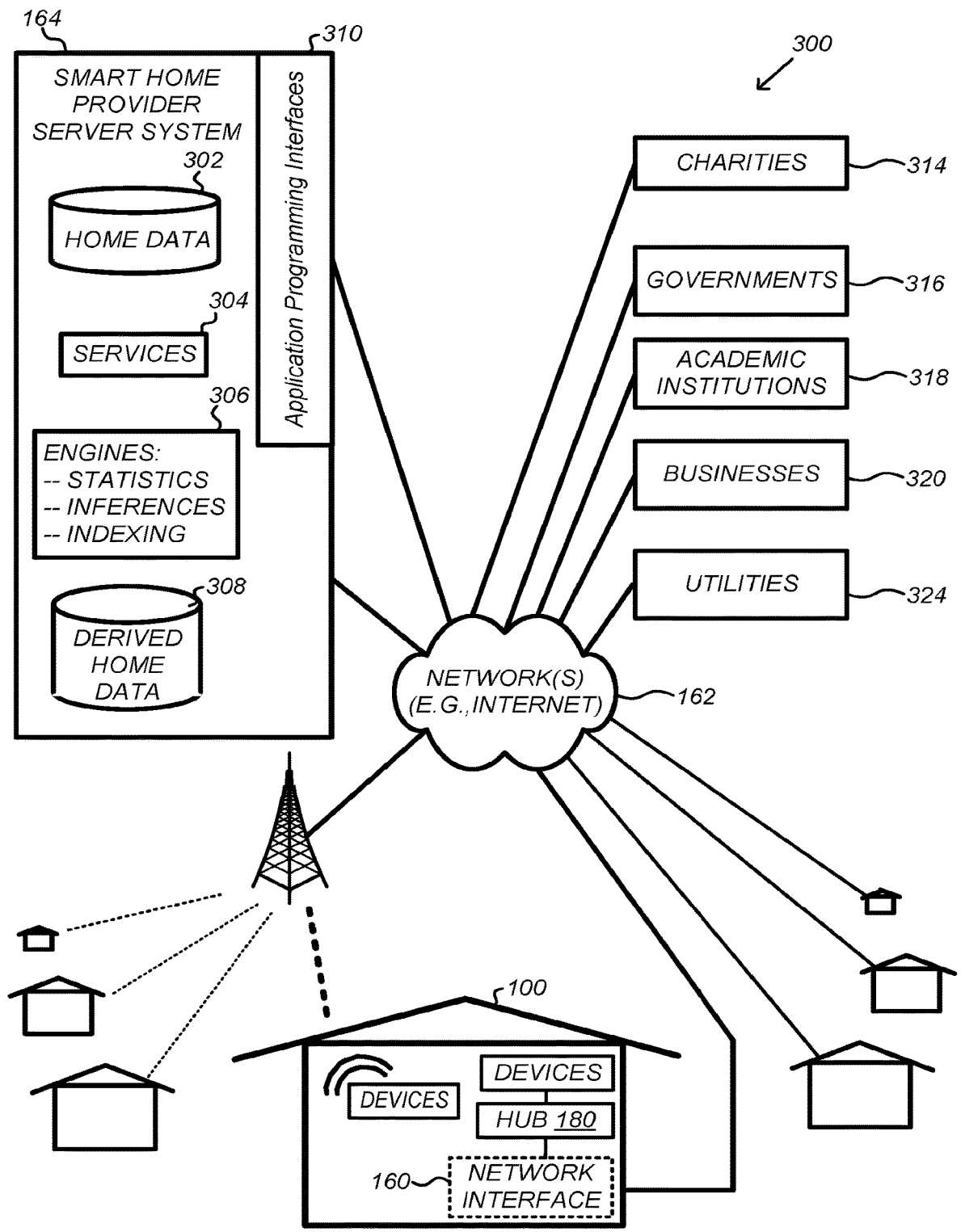
FIG. 3 illustrates a network-level view of an extensible devices and services platform with which the smart home environment of FIG. 1 is integrated, in accordance with some implementations.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee®, Z-Wave®, Insteon®, EuOcean®, Thread®, OSIAN, Bluetooth Low Energy® and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
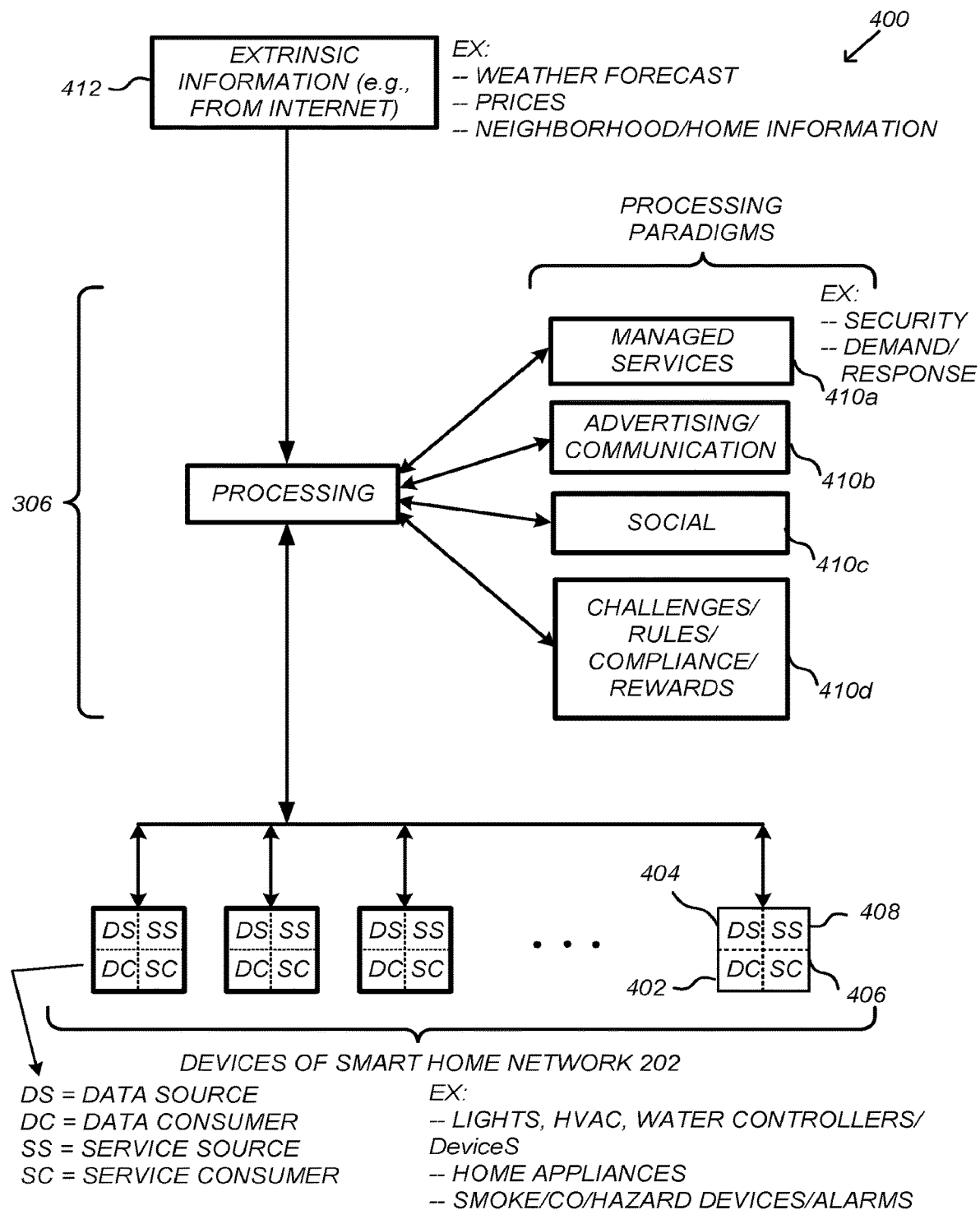
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410*d* that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
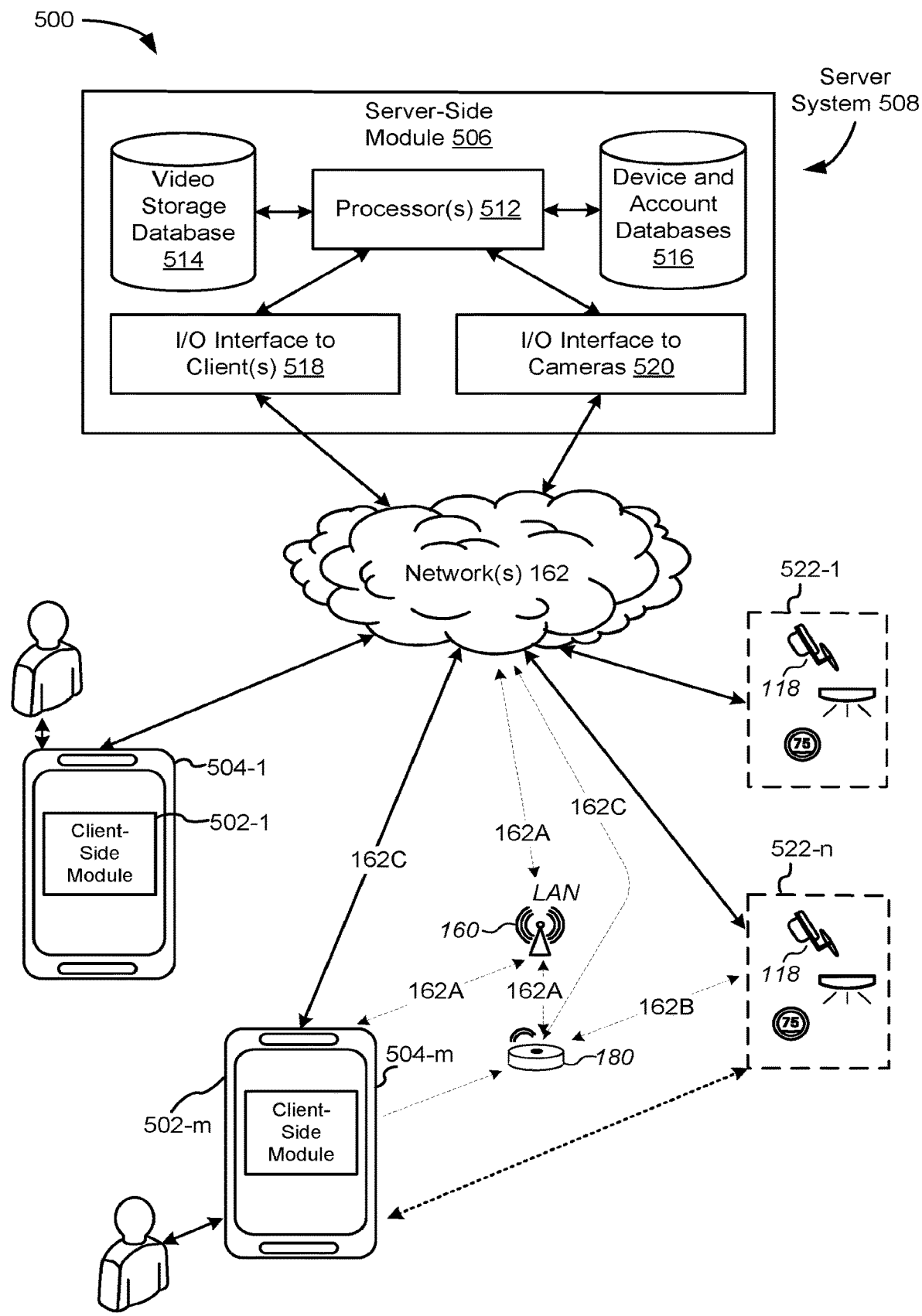
FIG. 5 is a representative operating environment in which a server system interacts with client devices and hub devices communicatively coupled to local smart devices, in accordance with some implementations.

FIG. 5 illustrates a representative operating environment 500 in which a server system 508 provides data processing for one or more smart devices, such as one or more cameras 118. In some implementations, the server system 508 monitors and facilitates review of motion events in video streams captured by video cameras 118. In some implementations, server system 508 monitors and facilitates review of radar events detected by one or more radar-equipped smart devices. As shown in FIG. 5, in some implementations, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 includes a dedicated video processing server that provides video processing services to video sources and client devices 504 independent of other services provided by the server system 508. In some implementations, the server system 508 includes a dedicated radar processing server that provides radar processing services for various radar-equipped devices and client device 504.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508. In some implementations, the captured video is stored in a local storage (not shown) prior to being uploaded to the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet®, Universal Serial Bus (USB), FireWire®, Long Term Evolution (LTE), Global System for Mobile Communications (GSM), Enhanced Data GSM Environment (EDGE), code division multiple access (CDMA), time division multiple access (TDMA), Bluetooth®, Wi-Fi®, voice over Internet Protocol (VOIP), Wi-MAX®, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth® Personal Area Network (PAN). The Bluetooth® PAN is optionally established based on classical Bluetooth® technology or Bluetooth Low Energy® (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
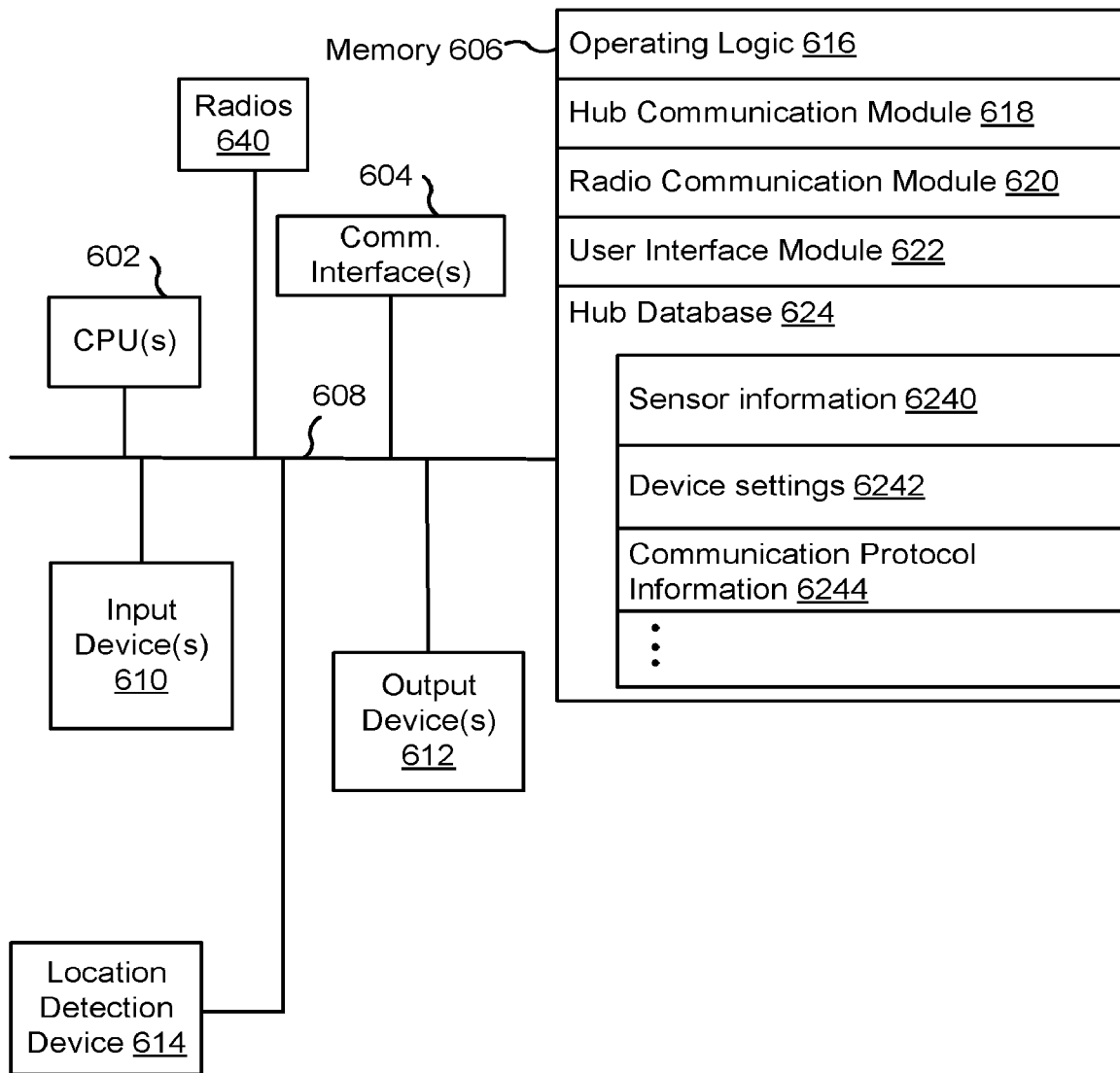
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, radar, occupancy sensors (e.g., using RFID sensors), ambient light sensors, motion detectors, accelerometers, and/or gyroscopes.

The radios 640 enable and/or connect to one or more radio communication networks in the smart home environments, and allow a hub device to communicate with smart devices 204. In some implementations, the radios 640 are capable of data communications using any of a variety of custom or standard wireless protocols (e.g., IEEE 802.15.4, Wi-Fi®, ZigBee®, 6LoWPAN, Thread®, Z-Wave®, Bluetooth Smart®, ISA100.11a, WirelessHART®, MiWi®, etc.) custom or standard wired protocols (e.g., Ethernet®, HomePlug®, etc.), and/or any other suitable communication protocol, including communication protocols not yet developed as of the filing date of this document. In some implementations, the radios 640 include multiple different physical radios, each of which implements a different communication protocol. For example, in some implementations the radios 640 include a Wi-Fi® radio, a Bluetooth® radio and an IEEE 802.15.4 radio, all of which operate at 2.4 GHz. In some implementations, the radios 640 include one or more radar transceivers. In some implementations, some of the radios are combined. For example, in some implementations, a Bluetooth® radio and a Wi-Fi® radio are incorporated in a single chip coupled to a single antenna. In other implementations, a Bluetooth® radio and an IEEE 802.15.4 radio are incorporated in a single chip coupled to a single antenna. Any combination of these radios can be implemented in any of the smart devices employed in a smart home environment.

In some implementations, hub device 180 includes a radar subsystem. In some implementations, the radar subsystem uses radio waves (also sometimes called radar signals) to determine the range, angle, position, or velocity of objects. In some implementations, the radar subsystem transmits radio waves (or microwaves) that reflect from objects in their path. The radar subsystem further receives and processes the reflected waves to determine properties of the objects. In some implementations, the radar subsystem includes one or more communication modules (e.g., radio communication module 620) in memory 606, one or more radios 640, and/or one or more communication interfaces 604.

Communication interfaces 604 include, for example, hardware capable of interfacing the one or more radios 640 with the hub device 180, so as to enable data communications using any of a variety of custom or standard wireless protocols (e.g., IEEE 802.15.4, Wi-Fi®, ZigBee®, 6LoW-PAN, Thread®, Z-Wave®, Bluetooth Smart®, ISA100.11a, WirelessHART®, MiWi®, etc.) and/or any of a variety of custom or standard wired protocols (e.g., Ethernet®, Home-Plug®, etc.), or any other suitable communication protocol, including communication protocols not yet developed as of the filing date of this document. In some implementations, communication interfaces 604 include one or more antennas for transmitting and receiving signals as governed by radios 640.

Memory 606 includes high-speed random access memory, such as DRAM, SRAM, DDR RANI, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer-readable storage medium. In some implementations, memory 606, or the non-transitory computer-readable storage medium of memory 606, stores the following programs, modules, and data structures, or a subset or superset thereof:

Operating logic 616 including procedures for handling various basic system services and for performing hardware dependent tasks;

Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio communication module 620 for connecting the hub device 180 to other devices (e.g., controller devices, smart devices 204 in smart home environment 100, client devices 504, and/or electronic tags) via one or more radio communication devices (e.g., radios 640);

User interface module 622 for providing and displaying a user interface in which settings, captured data, and/or other data for one or more devices (e.g., smart devices 204 in smart home environment 100) can be configured and/or viewed; and Hub device database 624, including but not limited to:
Sensor information 6240 for storing and managing data received, detected, and/or transmitted by one or more sensors of the hub device 180 and/or one or more other devices (e.g., smart devices 204 in smart home environment 100);

Device settings 6242 for storing operational settings for one or more devices (e.g., coupled smart devices 204 in smart home environment 100), such as device identifications, timing settings, radar settings, operational modes, and/or preference settings; and Communication protocol information 6244 for storing and managing protocol information for one or more protocols (e.g., standard wireless protocols, such as ZigBee®, Z-Wave®, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

FIG. 7 is a block diagram illustrating the server system 508 in accordance with some implementations. The server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer-readable storage medium. In some implementations, memory 706, or the non-transitory computer-readable storage medium of memory 706, stores the following programs, modules, and data structures, or a subset or superset thereof:

Operating system 710 including procedures for handling various basic system services and for performing hardware dependent tasks;

Network communication module 712 for connecting the server system 508 to other systems and devices (e.g., client devices, electronic devices, and systems connected to one or more networks 162, FIGS. 1-5) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118 and/or radar information from a radar-equipped device), and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user), including but not limited to:

Radar processing module 7145 for processing radar data provided by radar-equipped devices, such as classifying radar events and identifying radar-detected entities;

Video processing module 7146 processing video data provided by one or more cameras, such as classifying motion events and identifying motion entities; and User interface sub-module 7150 for communicating with a user (e.g., sending alerts, timeline events, etc. and receiving user edits and zone definitions and the like); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information such as user profiles 7163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device information database 7164 for storing device information related to one or more devices such as device profiles 7165, e.g., device identifiers and hub device specific secrets, independently of whether the corresponding hub devices have been associated with any user account;

Event information database 7166 for storing event information such as event records 7168, e.g., event log information, event categories, and the like;

Tag information database 7170 for storing tag information for one or more electronic tags, e.g., tag identifiers, tag signal timing, tag location information, and the like;

Radar information database 7172 for storing radar information for one or more smart devices, e.g., radar band and/or mode information, historical radar data, radar object modeling information, and the like; and Device timing information 7174 for storing timing information for one or more smart device, e g, timing synchronization information for synchronizing various smart devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 706, optionally, stores a subset of the modules and data structures identified above. Furthermore, memory 706, optionally, stores additional modules and data structures not described above.

Figure 8:
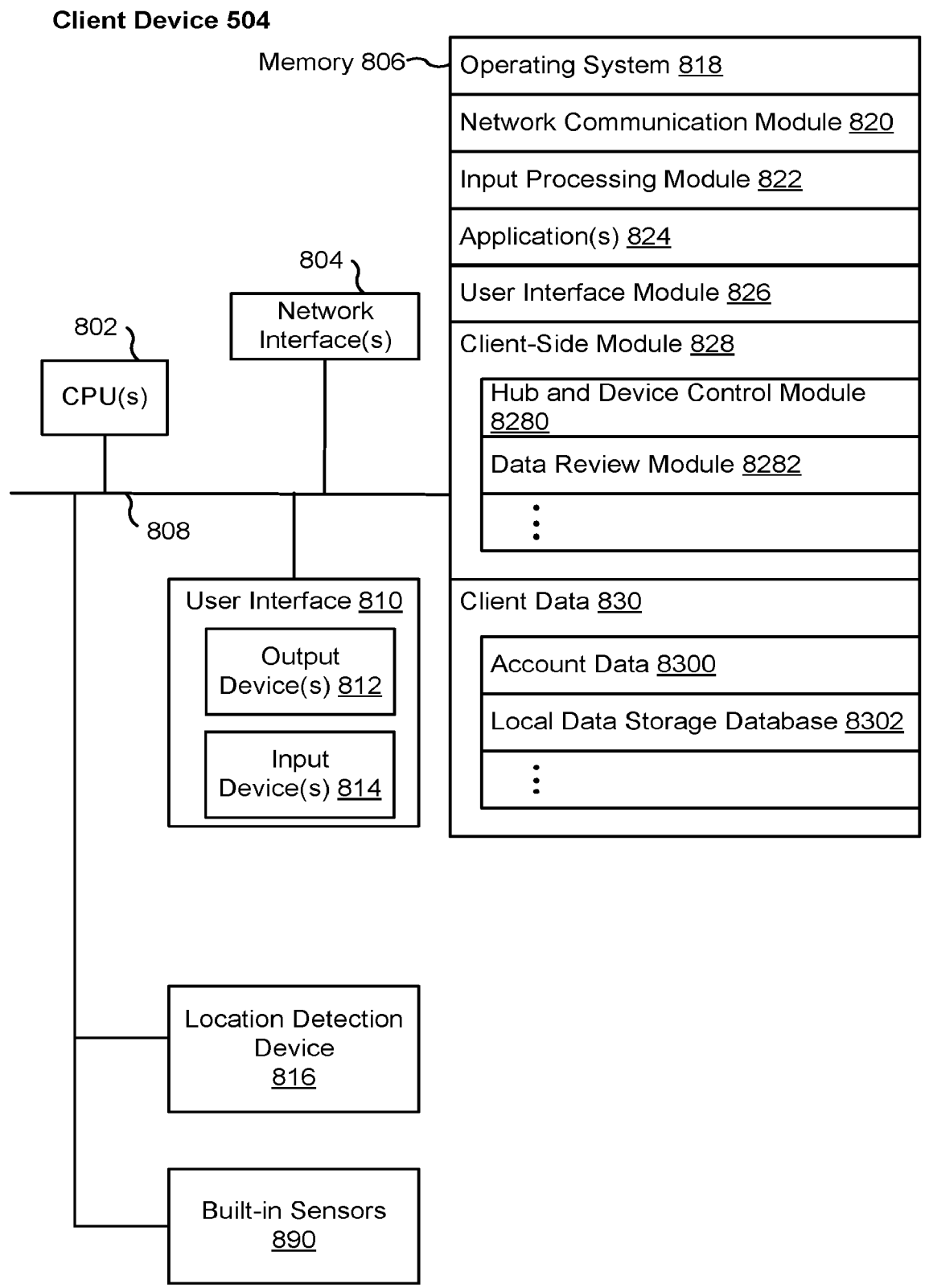
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer-readable storage medium. In some implementations, memory 806, or the non-transitory computer-readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., client devices, electronic devices, and systems connected to one or more networks 162, FIGS. 1-5) via one or more network interfaces 804 (wired or wireless);
- Input processing module 822 for detecting one or more user inputs or interactions from one of the one or more input devices 814 and interpreting the detected input or interaction;
- One or more applications 824 for execution by the client device (e g, games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- User interface module 622 for providing and displaying a user interface in which settings, captured data, and/or other data for one or more devices (e.g., smart devices 204 in smart home environment 100) can be configured and/or viewed;
- Client-side module 828, which provides client-side functionalities for device control, data processing and data review, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the server system 508; and
- Client data 830 storing data associated with the user account and electronic devices, including, but is not limited to:
  - Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - Local data storage database 8302 for selectively storing raw or processed data associated with electronic devices (eg, of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, client device 504 includes one or more graphical user interfaces and/or one or more modules for registering smart devices and/or electronic tags in the smart home environment. In some implementations, client device 504 includes an application, such as a smart home application, for interacting with a smart home environment. In some implementations, the smart home application includes one or more user interfaces for one or more of the following: registering smart device(s), registering electronic tag(s), adjusting operation of smart device(s), reviewing data from smart device(s), and the like. In some implementations, the smart home application includes user interface module 826 and client-side module 828.

Figure 9A:
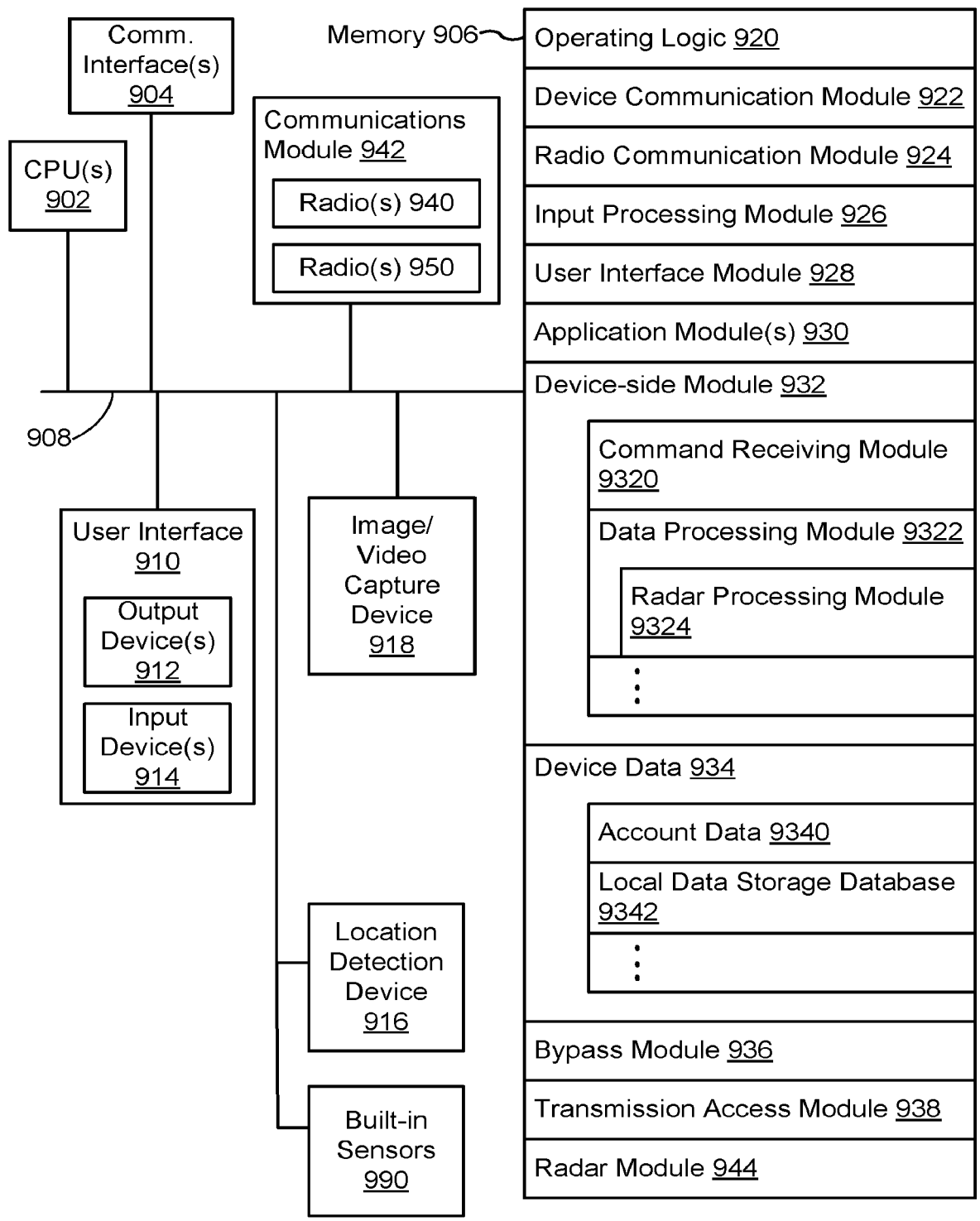
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any device of a smart home environment 100 (FIGS. 1 and 2), such as a camera 118, a smart hazard detector 104, a smart thermostat 102, hub device 180, etc.) includes one or more processing units (e.g., CPUs, ASICs, FPGAs, microprocessors, and the like) 902, memory 906, a communications module 942 that includes one or more radio(s) 940 and radio(s) 950, communication interfaces 904, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radio(s) 940 and radio(s) 950 enable one or more radio communication networks in the smart home environments, and allow a smart device 204 to communicate with other devices. In some implementations, the radio(s) 940 are capable of data communications using any of a variety of custom or standard wireless protocols (e.g., IEEE 802.15.4, Wi-Fi®, ZigBee®, 6LoWPAN, Thread®, Z-Wave®, Bluetooth Smart®, ISA100.11a, WirelessHART®, MiWi®, etc.) custom or standard wired protocols (e.g., Ethernet®, HomePlug®, etc.), and/or any other suitable communication protocol, including communication protocols not yet developed as of the filing date of this document. In some implementations, radio(s) 940 and/or radio(s) 950 are utilized for radar communications (e.g., to transmit and/or receive positioning information via radar).

Communication interfaces 904 include, for example, hardware capable of interfacing the one or more radio(s) 940 and 950 with the smart device 204, so as to enable data communications using any of a variety of custom or standard wireless protocols (e.g., IEEE 802.15.4, Wi-Fi®, Zig-Bee®, 6LoWPAN, Thread®, Z-Wave®, Bluetooth Smart®, ISA100.11a, WirelessHART®, MiWi®, etc.) and/or any of a variety of custom or standard wired protocols (e.g., Ethernet®, HomePlug®, etc.), or any other suitable communication protocol, including communication protocols not yet developed as of the filing date of this document. In some implementations, each radio(s) 940 and radio(s) 950 has a respective communication interface 904 for facilitating and managing data communications for the respective radio, while in other implementations, multiple radio(s) 940 and/or 950 are managed by a single communication interface 904.

In some implementations, radio(s) 940 and/or radio(s) 950 are configured to transmit and receive the same or distinct types of signals in the smart home environment. For example, radio(s) 940 may include transceivers configured to transmit data between other devices (e.g., smart devices) within the smart home environment (e.g., IEEE 802.15.4 communications protocol for unilaterally/bilaterally transmitting data between and among smart devices). Signals transmitted between devices optionally include, for example, signals directed to critical hazard information (e.g., pings indicating the detection of smoke) or device status information (e.g., ping indicating low battery). In contrast, in some implementations, the radio(s) 950 may include transceivers configured to transmit high-bandwidth data across data networks (e.g., IEEE 802.11 Wi-Fi® for uploading a video stream to a smart home provider server system 164). In some implementations, the radio(s) 940 and/or the radio(s) 950 include transceivers configured for close-range communications with devices (e.g., Bluetooth® communications protocol for device provisioning). In some implementations, the radio(s) 940 and/or the radio(s) 950 include transceivers configured to transmit low-power signals (e.g., smart hazard detectors 104 not connected to a persistent power source). In some implementations, radio(s) 940 and/or radio(s) 950 are configured to transmit multiple types of signals in the smart home environment (e.g., a Wi-Fi® radio 950 uploads video stream data to the smart home provider server system 164, in addition to routing received beacons to other nearby smart devices). In some implementations, the radio(s) 940 and/or the radio(s) 950 of a respective device include transceivers for directly and communicably bridging the respective device to other devices. For example, pairing devices directly via Bluetooth®, rather than communicating via a router by using Wi-Fi®. In some implementations, the radio(s) 940 and/or the radio(s) 950 are configured to translate signals received through a first radio 940, and further to re-transmit the translated signals using the first radio 940 and/or a radio 950 (e g, a proprietary message format is received via Bluetooth® and translated, where the translated messages are re-transmitted to other devices using Wi-Fi®).

In some implementations, the radio(s) 940 and/or the radio(s) 950 include transceivers configured to transmit data via RFID (e.g., for use in identifying electronic tags and/or other devices). In some implementations, the radio(s) 940 and/or the radio(s) 950 include transceivers configured for radar operations (e.g., for use in determining distances, velocities, and the like). In some implementations, the radio(s) 940 and/or the radio(s) 950 are configured for radar operations via one or more radio frequency bands, such as 3-10 GHz, 24-24.5 GHz, 57-64 GHz, and/or 77-81 GHz.

The communications module 942 includes a variety of components for enabling the receiving and transmitting of signals by a respective smart device 204, including one or more amplifiers, oscillators, antennas, filters, switches, memory, firmware, and/or any other support circuits or circuit components. In some implementations, the one or more radio(s) 940 and radio(s) 950 are integrated components of the communications module 942 (e.g., System on a Chip (SOC)). In some implementations, the one or more radio(s) 940 and radio(s) 950 have respective circuit components. Alternatively, the one or more radio(s) 940 and radio(s) 950 share one or more circuit components.

In some implementations, the communications module 942 includes a 1D radar subsystem having one transmitter and one receiver. In some implementations, the communications module 842 includes a multi-dimensional radar subsystem. For example, in some implementations, the communications module 842 includes two radar transmitters and four radar receivers.

Memory 906 includes high-speed random access memory, such as DRAM, SRAM, DDR RANI, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer-readable storage medium. In some implementations, memory 906, or the non-transitory computer-readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);

Radio communication module 924 for connecting the smart device 204 to other devices (e.g., controller devices, smart devices 204 in smart home environment 100, client devices 504) utilizing radio communication in conjunction with communications module 942;

Input processing module 926 for detecting one or more user inputs or interactions from the one or more input devices 914 and interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed;

One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204; and

- Data processing module 9322 for processing data captured or received by one or more inputs (e.g., input devices 914, image/video capture devices 918, location detection device 916), sensors (e.g., built-in sensors 990), interfaces (e.g., communication interfaces 904, radio(s) 940), and/or other components of the smart device 204, and for preparing and sending processed data to a device for review (e.g., client devices 504 for review by a user), including but not limited to:
  - Radar processing module 9324 for processing radar data captured or received by the smart device 204, such as classifying radar events, recognizing radar entities, and/or aggregating radar data with data from other sensors (e.g., video data);
- Device data 934 storing data associated with devices (e.g., the smart device 204), including but not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., captured video footage and/or radar data);
- Bypass module 936 for detecting whether radio(s) 940 and/or radio(s) 950 are transmitting signals via respective antennas coupled to the radio(s) 940 and/or radio(s) 950, and to accordingly couple radio(s) 940 and/or radio(s) 950 to their respective antennas either via a bypass line or an amplifier;
- Transmission access module 938 for granting or denying transmission access to one or more radio(s) 940 and/or radio(s) 950 (e.g., based on detected control signals and transmission requests); and
- Radar module 944 for sending, receiving, and/or manipulating radar signals (e.g., in conjunction with communications module 942 and/or communications interface 904).

Each of the above identified elements may be stored in one or more of the previously mentioned memory devices, and corresponds to a set of instructions for performing a function described above. For example, in some implementations, the one or more radio(s) 940 and radio(s) 950 include respective memory and firmware for storing one or more programs/executable modules of the memory 906. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above, such as a video processing module.

Figure 9B:
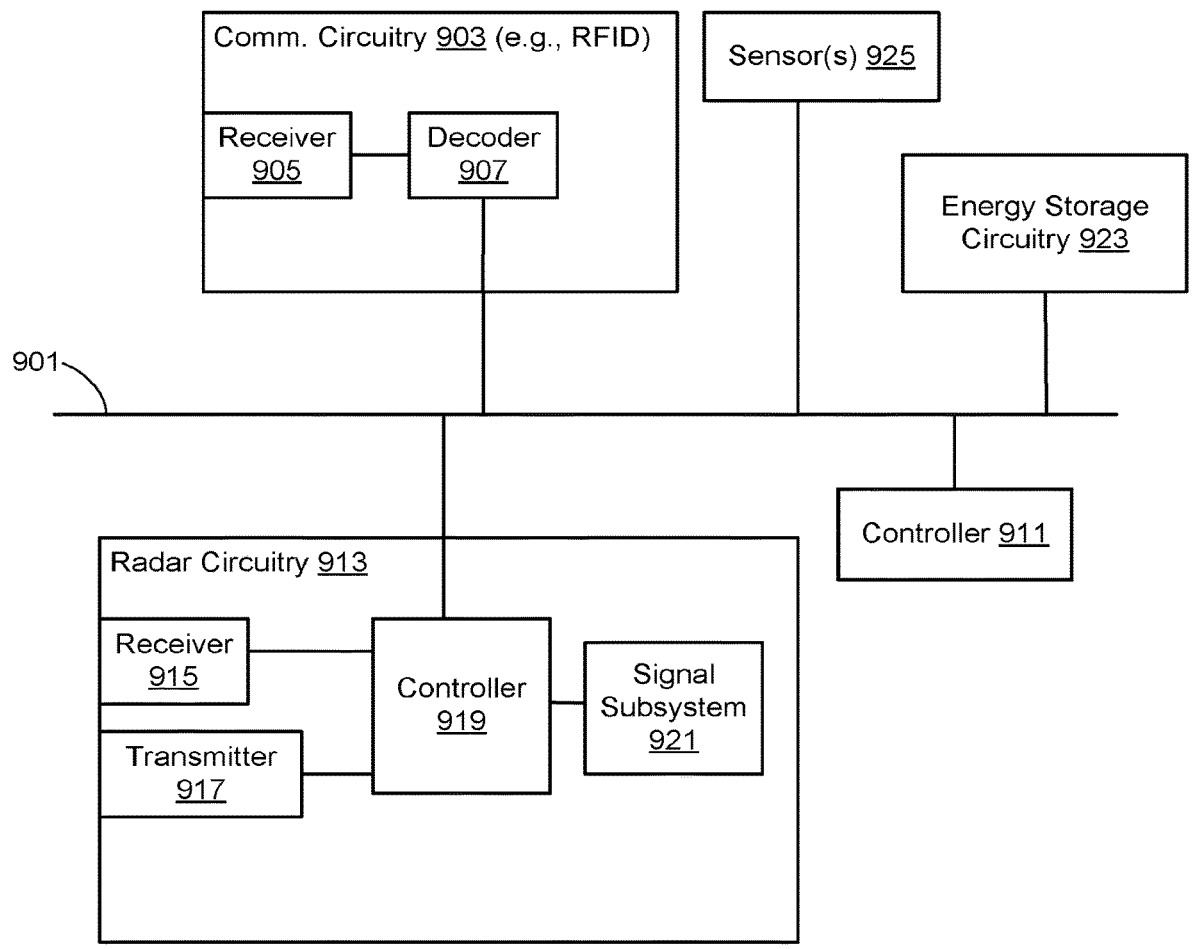
FIG. 9B is a block diagram illustrating a representative electronic tag, in accordance with some implementations.

FIG. 9B is a block diagram illustrating a representative electronic tag (also sometimes called a radar- and wirelessly-equipped electronic device) in accordance with some implementations. FIG. 9B shows the electronic tag 206 including communication circuitry 903, radar circuitry 913, a controller 911, energy storage circuitry 923, and communication line(s) 901. In some implementations, the electronic tag 206 includes one or more additional sensors 925, such as a humidity sensor, an accelerometer, a gyroscope, a temperature sensor, an optical sensor, and the like. In some implementations, the controller 911 is a component of the communication circuitry 903. The communication circuitry 903 includes a receiver 905 for receiving signals such as RFID signals. In some implementations, the communication circuitry 903 includes a transmitter (not shown) for transmitting signals, such as RFID signals. In some implementations, the communication circuitry 903 includes a decoder 907 for decoding and/or decrypting signals received via the receiver 905. In some implementations, the decoder 907 is a component of the controller 911. In some implementations, the controller 911 decodes and/or decrypts signals received via the receiver 905. In some implementations, the communication circuitry 903 includes an encoder (not shown) for encoding outgoing transmissions.

The radar circuitry 913 includes a receiver 915 for receiving radar signals, a transmitter 917 for transmitting radar signals, a controller 919 for managing various components of the radar circuitry 913, such as the receiver 915 and/or the transmitter 917, and a signal subsystem 921. In some implementations the controller 919 is a component of the controller 911. In some implementations, the signal subsystem 921 includes components for amplifying, modulating, and/or generating radar signals. In some implementations, the radar circuitry 913 comprises passive radar circuitry, while in other implementations, the radar circuitry 913 comprises active radar circuitry. In some implementations, the energy storage circuitry 923 includes an energy storage device, such as a capacitor or battery. In some implementations, the energy storage circuitry 923 includes circuitry to couple the electronic tag 206 to an external power source, such as a battery or outlet. In some implementations, the energy storage circuitry 923 includes a power management integrated circuit (IC). In some implementations, the energy storage circuitry 923 includes circuitry to harvest energy from signals received via an antenna (e.g., the receiver 905) of the electronic tag. In some implementations, the energy storage circuitry 923 includes circuitry to harvest thermal, vibrational, electromagnetic, and/or solar energy received by the electronic tag.

In some implementations, the controller 911 is configured to: (1) receive a command from another device via the one or more antennas; (2) determine whether the command was intended for the electronic tag (e.g., based on a unique ID of the electronic device); (3) in accordance with a determination that the command was intended for the electronic tag, operate in accordance with the command; and (4) in accordance with a determination that the command was not intended for the electronic tag, disregard the command.

In some implementations, the functions of any of the devices and systems described herein (e.g., hub device 180, server system 508, client device 504, smart device 204, smart home provider server system 164) are interchangeable with one another and may be performed by any other devices or systems, where the corresponding sub-modules of these functions may additionally and/or alternatively be located within and executed by any of the devices and systems. The devices and systems shown in and described with respect to FIGS. 6-9 are merely illustrative, and different configurations of the modules for implementing the functions described herein are possible in various implementations.

As described with respect to FIGS. 6-9, devices and tags in a smart home environment (e.g., smart devices 204 in FIG. 2, such as cameras 118, smart thermostats 102, smart hazard detectors 104, etc. of a smart home environment 100, FIG. 1) include a host of circuit components and interfaces for enabling communications with other systems, devices, and/or servers. For example, in some implementations, smart devices include a communications module (e.g., communications module 942, FIG. 9A) which comprises one or more radio(s) 940 and/or radio(s) 950 for receiving and transmitting signals to other devices and across networks (sometimes referred to generally as "transceivers" or "transceiver devices"). In some implementations, the one or more radio(s) 940 and radio(s) 950 are components of a single integrated circuit (e.g., System on a Chip (SOC)). Given the typical physical compactness of smart devices, components of the communications module 942 and other components of the device are often collocated in close physical proximity with one another. For example, a typical smart device may contain multiple radio antennas, memory devices, sensors, chips, and other electronic components. As a consequence of their close physical spacing within smart devices, however, and in combination with components coming into close contact with conductive materials (e.g., metal casing, camera stand, wires, etc.), device components, such as antennas, are typically poorly isolated from transmissions of one another. Additionally, because these devices sometimes share the same or close frequency bands in operation (e.g., IEEE 802.11 (i.e., Wi-Fi®) and 802.15.4 sharing 2.4 GHz frequency band), signals transmitted by one component tend to interfere with signals transmitted and/or received by other components. Ultimately, components of the communications module 942 typically achieve poor signal-to-noise ratio (SNR), distortion, degraded analog signal quality, and increased bit error rate (BER).

Furthermore, the poor isolation of these devices has an additional impact on the maximum input power of device components, since the transmission power of signals transmitting by one transceiver adds unexpectedly to the expected transmission of signals simultaneously received by other nearby transceivers. Sensitive device components are thus often risk of damage when their input power thresholds are exceeded.

A. Radar Tag Operations

Figure 10A:
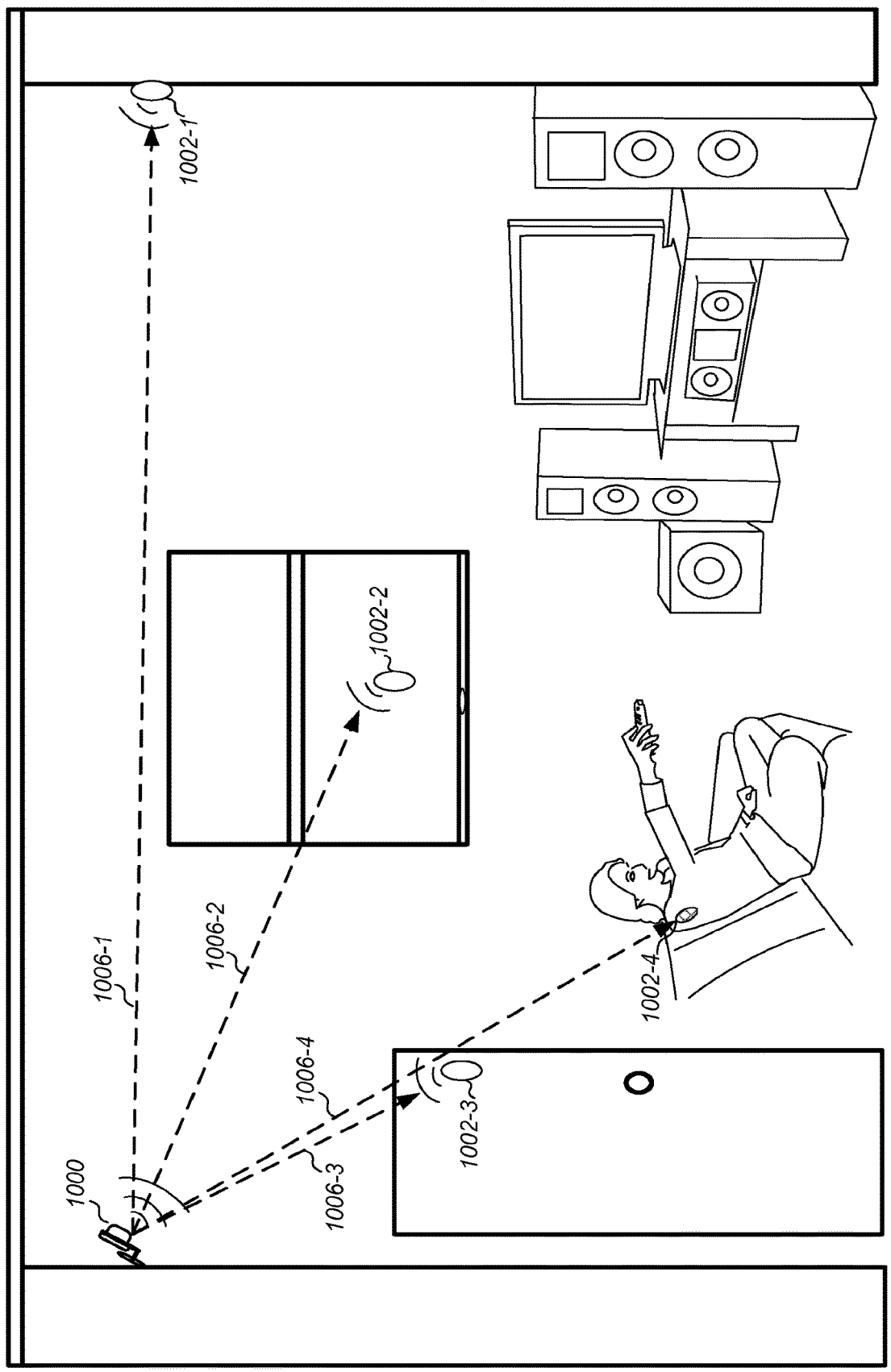
FIG. 10A illustrates an environment and system for communicating via radar signals, in accordance with some implementations.

FIG. 10A shows an environment and system for communicating via radar signals in accordance with some implementations. FIG. 10A shows a control device 1000 communicating via signals 1006 with electronic tags 1002 within a dwelling. In some implementations, the control device 1000 is a smart device, such as a camera, a thermostat, a hazard detector, a hub device, or the like. In some implementations, the control device 1000 comprises a smart device 204 (e.g., FIG. 9A), in accordance with any of the implementations disclosed in FIGS. 1-9 (e.g., devices 102, 104, 106, 108, 110, 112, 114, 116, 118, 120, and/or 122, FIG. 1, such as a camera 118, a smart hazard detector 104, a smart thermostat 102, etc.). In some implementations, the electronic tags 1002 comprise electronic tags 206 (FIG. 9B). In some implementations, the signals 1006 comprise RFID signals. In some implementations, the signals 1006 comprise signals transmitted at a same frequency, while in other implementations, at least a subset of the signals 1006 are transmitted a distinct frequencies (e.g., distinct frequencies within a frequency band). In some implementations, the signals 1006 each include device identification information. For example, each of the electronic tags 1002 receives the signal 1006-1 and analyzes the included device identification information to determine whether the signal 1006-1 was intended for the particular tag. Thus, in accordance with some implementations, the signal 1006-1 includes device identification for the electronic tag 1002-1, the signal 1006-2 includes device identification for the electronic tag 1002-2, the signal 1006-3 includes device identification for the tag 1002-3, and the signal 1006-4 includes device identification for the tag 1002-4. The control device 1000 further transmits and receives radar signals. In some implementations, the radar signals are used to determine distance, velocity, acceleration, location, and/or direction of movement for a plurality of objects within signal range. The electronic tags 1002 communicate via radar signals with control device 1000. For example, the electronic tags 1002 cause positioning information (e.g., phantom velocities) to be transmitted and the control device 1000 receives and analyzes the positioning information in accordance with radar processing techniques to determine positions of the electronic tags 1002. In some implementations, the electronic tags 1002 communicate via radar signals in response to an enablement signal (e.g., signal 1006-1). In some implementations, communicating via radar signals comprises reflecting, modifying, and/or amplifying received radar signals. In some implementations, communicating via radar signals comprises generating radar signals at the electronic tag independent of any radar signals received by the tag. As shown in FIG. 10A, an electronic tag 1002 is optionally configured to be affixed to inanimate objects such as walls and ceilings, moving objects such as doors and windows, and/or moving entities such as people and pets. In some implementations, the control device 1000 adjusts one or more settings (e.g., one or more settings of a smart home environment) based on the location and/or movement of a person determined based on the affixed tag's radar responses. For example, the control device 1000 adjusts lightning in a room based on whether person's location in room (e.g., whether the person is sitting in a read chair or lounging on the couch). As another example, the control device 1000 adjusts audio levels and/or balancing based on one or more persons locations within a room.

In some implementations, an electronic tag 1002 is configured to be affixed to small objects, such as keys or a remote control, and to assist a user in locating the small objects. For example, the control device 1000 locates small objects to which an electronic tag 1002 is affixed based on radar responses of the electronic tag 1002. In some implementations, an electronic tag 1002 is configured to be affixed to objects of value to a user, such as a speaker system, jewelry box, or antique vase, and to assist a user in monitoring the location of the objects. For example, the control device 1000 uses positioning data based on the electronic tag's radar responses (or a lack of radar responses) to determine whether the object is within predefined boundaries (e.g., within the home or office). In this example, the control device 1000 alerts the user (and/or the police) if it determines that the object is not within the predefined boundaries.

Figure 10B:
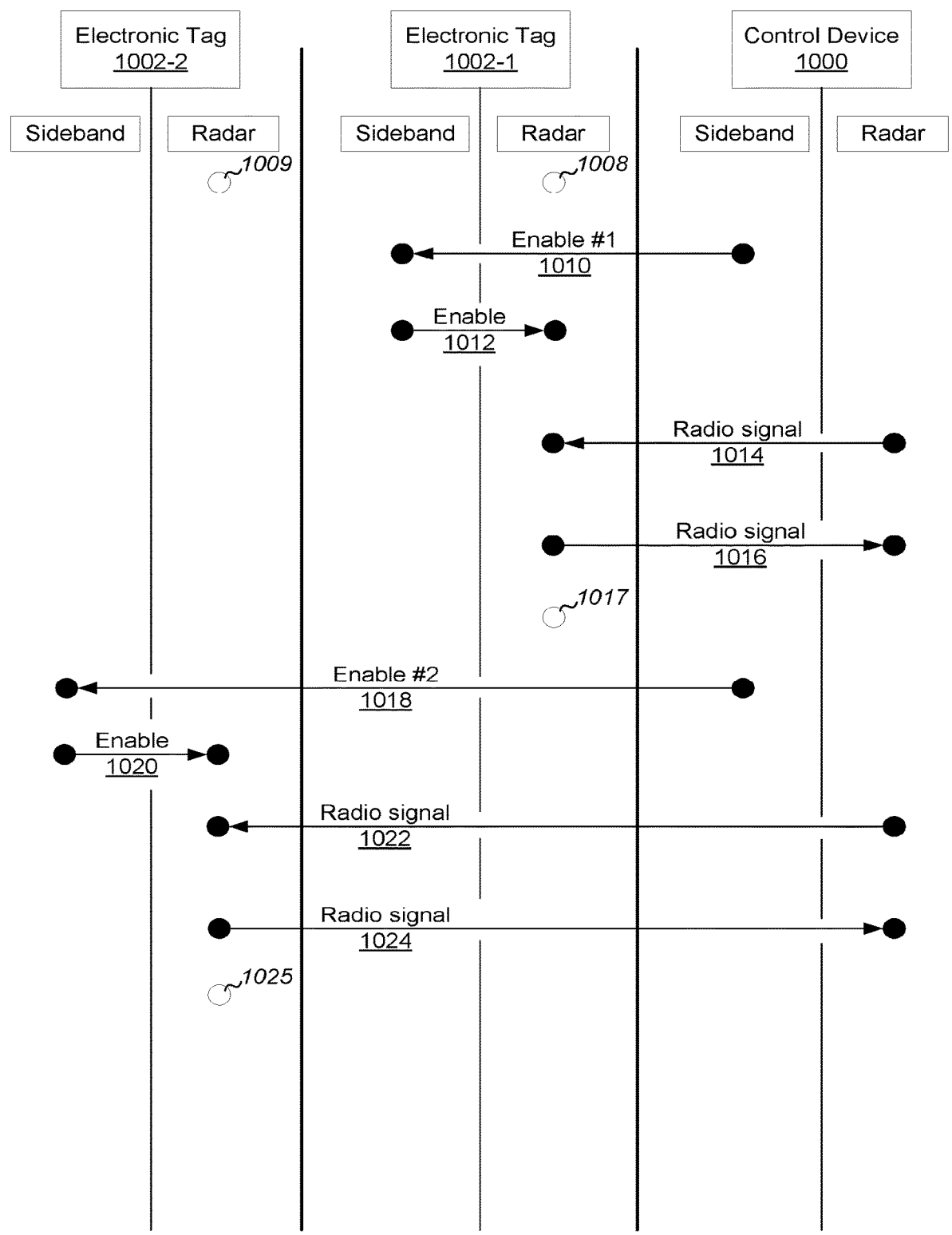
FIG. 10B illustrates a representative system and process for utilizing radar tags, in accordance with some implementations.

FIG. 10B illustrates a representative system and process for utilizing radar tags, in accordance with some implementations. At a first time, the radar circuitry for electronic tags 1002-1 and 1002-2 are disabled as illustrated by 1008 and 1009. In some implementations, disabling the radar circuitry includes disconnecting the radar circuitry from a power source. In some implementations, disabling the radar circuitry includes preventing the radar circuitry from transmitting radio signals.

At a second time, the control device 1000 (e.g., smart device 204) transmits a first enable signal 1010 via a sideband (e.g., Wi-Fi®). The electronic tag 1002-1 receives the first enable signal 1010. In some implementations, the electronic tag 1002-1 determines that the first enable signal 1010 is intended for the electronic tag 1002-1. In some implementations, determining that the first enable signal 1010 is intended for the electronic tag 1002-1 includes comparing device identification within signal 1010 with device identification of the electronic tag 1002-1. In response to receiving the first enable signal 1010, or in response to determining that the signal 1010 was intended for the electronic tag 1002-1, the electronic tag 1002-1 enables (1012) its radar circuitry.

In some implementations, the electronic tag 1002-2 receives the first enable signal 1010 and determines that the first enable signal is not intended for the electronic tag 1002-2.

At a third time, the control device 1000 transmits a radio signal 1014 using its radar circuitry. The electronic tag 1002-1 receives the radio signal 1014. In some implementations, the electronic tag 1002-1 modifies the received radio signal 1014. In some implementations, modifying the radio signal 1014 includes amplifying the radio signal 1014 and/or modulating the radio signal 1014. In some implementations, the electronic tag 1002-1 transmits the modified radio signal 1016. In some implementations, the electronic tag 1002-1 transmits a radio pulse or tone in response to receiving the radio signal 1014. Subsequent to sending radio signal 1016, the electronic tag 1002-1 disables (1017) its radar circuitry.

The control device 1000 receives the signal 1016 from the electronic tag 1002-1. In some implementations, the control device 1000 processes the received signal 1016 to determine the location and/or motion of electronic tag 1002-1. In some implementations, the control device 1000 sends information regarding radio signals 1014 and 1016 to another device (e.g., a device of server system 508) for processing.

At a fourth time, the control device 1000 transmits a second enable signal 1018 via the sideband. The electronic tag 1002-2 receives the second enable signal 1018. In some implementations, the electronic tag 1002-2 determines that the second enable signal 1018 is intended for the electronic tag 1002-2. In response to receiving the second enable signal 1018, or in response to determining that the signal 1018 was intended for the electronic tag 1002-2, the electronic tag 1002-2 enables (1020) its radar circuitry.

At a fifth time, the control device 1000 transmits a radio signal 1022 using its radar circuitry. The electronic tag 1002-2 receives the radio signal 1022. In some implementations, the electronic tag 1002-2 modifies the received radio signal 1022. In some implementations, the electronic tag 1002-2 transmits the modified radio signal 1024. In some implementations, the electronic tag 1002-2 transmits a radio pulse or tone signal 1024 in response to receiving the radio signal 1022. Subsequent to sending radio signal 1024, the electronic tag 1002-2 disables (1025) its radar circuitry.

The control device 1000 receives the signal 1024 from the electronic tag 1002-2. In some implementations, the control device 1000 processes the received signal 1024 to determine the location and/or motion of electronic tag 1002-2. In some implementations, the control device 1000 sends information regarding radio signals 1022 and 1024 to another device (e.g., a device of server system 508) for processing.

Figure 10C:
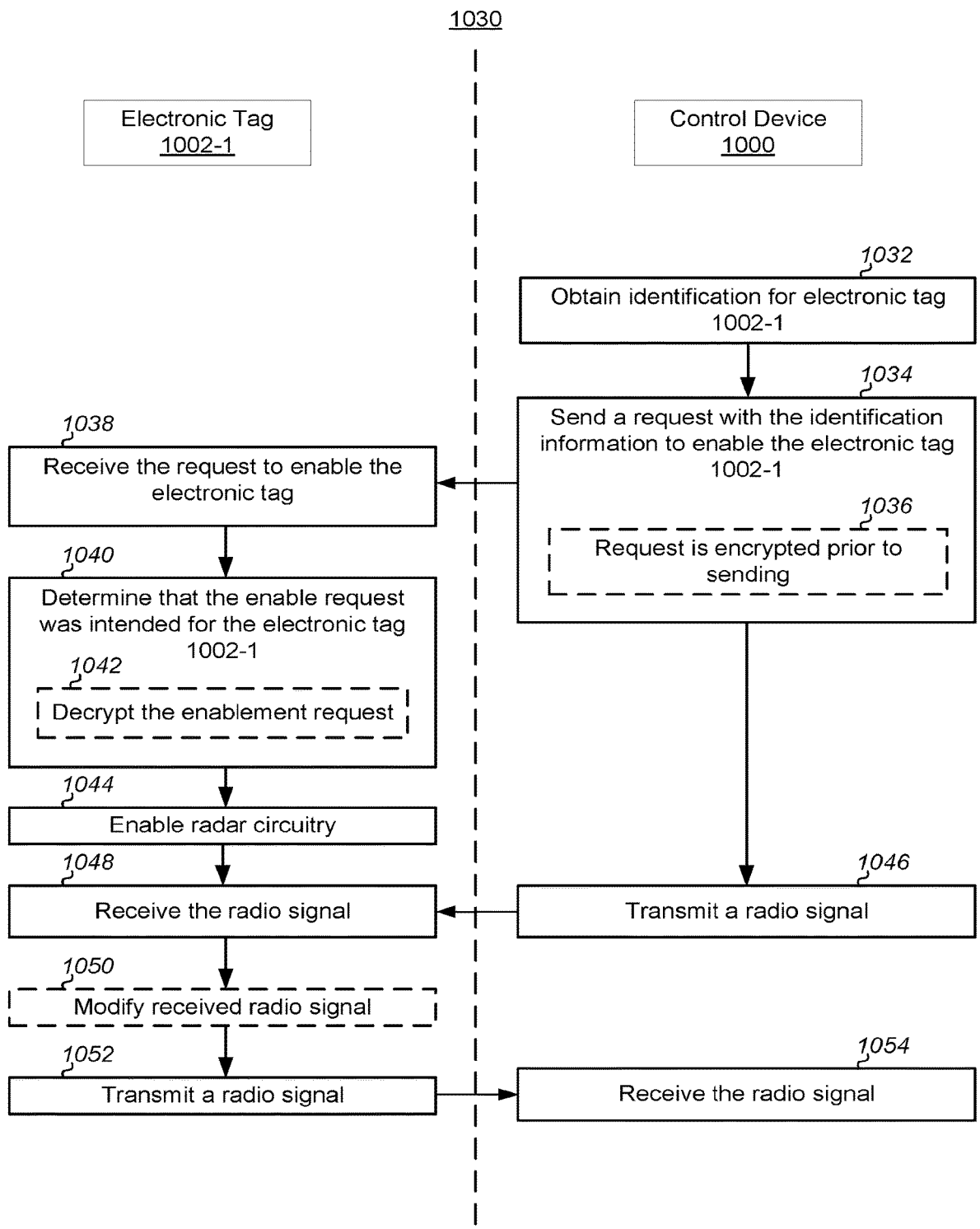
FIG. 10C illustrates a representative system and process for utilizing a radar tag, in accordance with some implementations.

FIG. 10C illustrates a representative system and process for utilizing a radar tag, in accordance with some implementations. The control device 1000 obtains (1032) identification for the electronic tag 1002-1. In some implementations, the identification is obtained via an application, such as a smart home application, on a client device 504. In some implementations, the client device 504 scans a barcode or QR code of the electronic tag 1002-1 and transmits the scanned information to the control device 1000.

The control device 1000 sends (1034) a request with the identification information to enable the electronic tag 1002-1. In some implementations, the request is sent via a first communications channel (e.g., RFID). In some implementations, the control device 1000 encrypts (1036) the request prior to sending.

The electronic tag 1002-1 receives (1038) the request to enable the electronic tag 1002-1. The electronic tag determines (1040) that the enable request was intended for the electronic tag 1002-1. In some implementations, prior to determining whether the enable request was intended for the electronic tag 1002-1, the electronic tag 1002-1 decrypts (1042) the enablement request. In some implementations, determining that the enable request was intended for the electronic tag 1002-1 includes comparing the identification information in the request with device identification stored at electronic tag 1002-1.

In accordance with the determination that the enable request was intended for the electronic tag 1002-1, the electronic tag 1002-1 enables (1044) its radar circuitry. In some implementations enabling the radar circuitry comprises supplying power to one or more components of the radar circuitry. In some implementations, enabling the radar circuitry comprises configuring the radar circuitry to respond to received radio signals (e.g., received radio signals having a particular frequency or within a particular frequency range).

The control device 1000 transmits (1046) a radio signal. In some implementations, the control device 1000 utilizes radar circuitry to transmit the radio signal.

The electronic tag 1002-1 receives (1048) the radio signal. In some implementations, the radio signal is received via the radar circuitry of the electronic tag 1002-1. In some implementations, the electronic tag 1002-2 modifies (1050) the received radio signal. In some implementations, modifying the received radio signal includes amplifying and/or modulating the received radio signal. The electronic tag 1002-1 transmits (1052) a radio signal corresponding to the radio signal transmitted by the control device 1000. In some implementations, the transmitted signal includes the modified signal. In some implementations, the transmitted signal includes a radio tone and/or pulse generated by the electronic tag 1002-1.

The control device 1000 receives (1054) the radio signal transmitted by the electronic tag 1002-1. In some implementations, the control device 1000 processes the received radio signal to determine a location and motion of the electronic tag 1002-1. In some implementations, the control device 1000 transmits information regarding its transmitted radio signal the radio signal received from the electronic tag 1002-1 to a second device or server system (e.g., server system 508) for processing.

In some implementations, the control device 1000 obtains information (e.g., during a registration process) regarding an object to which each electronic tag 1002 is affixed. For example, the control device 1000 obtains information that the electronic tag 1002-1 is affixed to a wall; information that the electronic tag 1002-2 is affixed to a window; and information that the electronic tag 1002-3 is affixed to a door. In some implementations, the control device 1000 utilizes the object information in processing received radar signals. For example, the control device 1000 ignores radar information related to objects beyond the wall to which the electronic tag 1002-1 is affixed.

In some implementations, the control device 1000 is configured to enable each of the electronic tags 1002 at particular times (or at particular time intervals) to reduce interference between electronic tag communications. For example, the control device 1000 is configured such that only one electronic tag is communicating via radar at a given time. In some implementations, the control device 1000 sends enablement signals to enable radar communication for a particular electronic tag. In some implementations, the control device 1000 sends disable signals to disable radar communication for a particular electronic tag.

In some implementations, each of the electronic tags 1002 is configured to communicate via radar at set intervals. In some implementations, the intervals are set by the control device 1000 such that only one electronic tag 1002 is communicating at a given time. In some implementations, the intervals are based at least in part on the object to which the electronic tag is affixed. For example, in accordance with some implementations, an electronic tag affixed to a wall communicates once per day while an electronic tag affixed to a window communicates once per minute.

In some implementations, an electronic tag 1002 communicates via radar in response to stimulus received at a sensor of the electronic tag. For example, the electronic tag 1002-3 communicates via radar in response to detecting movement of the door (e.g., via an accelerometer) to which it is affixed. In some implementations, the electronic tag 1002 detects movement of the object to which it is affixed and, in response, sends a notification to the control device 1000 (e.g., via a sideband). In some implementations, the control device 1000 receives the notification and, in response, transmits a radio signal for use in radar analysis.

In some implementations, the control device 1000 uses the radar communications from the electronic tags 1002 in conjunction with other radar signals to improve the accuracy and precision of the radar system. For example, the control device 1000 detects slight movement of the door to which the tag 1002-3 is affixed during a particular time frame. In this example, during the same time frame, the tag 1002-3 transmits a signal, and the control device 1000 utilizes the detected movement of the door and the signal from the tag 1002-3 to map the movement of the door (e.g., with greater precision/accuracy than a mapping based on just the detected movement of the door).

In some implementations, an electronic tag, such as electronic tag 1002-3, is affixed (e.g., temporarily) to an object and a registration signal is sent to the control device 1000. In some implementations, the registration signal is sent via an application (e.g., a smart home application) on a mobile device, such as client device 504. In some implementations, the registration signal includes information about the object to which the electronic tag is affixed (e.g., identifying the object as a door, window, or wall). In some implementations, control device 1000 completes the registration process by processing the registration information and radar information received from the electronic tag to classify the object to which the electronic tag is affixed and/or determine the object's location relative to the control device 1000. In some implementations, the classification and/or location information is used for future radar processing. In some implementations, after the registration process is completed, the electronic tag is not used in future radar processing of the object. In some implementations, after the registration process is completed, the electronic tag is used to register one or more additional objects.

In some implementations, an electronic tag (e.g., electronic tag 1002-1) for affixing to an object and imparting a radar signature for the object includes a first circuit configured to communicate with one or more other devices at a first frequency (e.g., communication circuitry 903, FIG. 9B). In some implementations the first circuit includes: (a) one or more antennas configured to communicate at the first frequency (e.g., receiver 905); and (b) a first controller coupled to the one or more antennas (e.g., controller 911) and configured to govern the one or more antennas. In some implementations, the electronic tag includes a second circuit configured to communicate with the one or more other devices via radar (e.g., radar circuitry 913). In some implementations, the second circuit includes: (a) one or more second antennas configured to communicate via radar (e.g., receiver 915 and/or transmitter 917); (b) a second controller coupled to the one or more second antennas and the first controller (e.g., controller 919) and configured to communicate with the first controller and to govern the one or more second antennas.

In some implementations, the first controller is further configured to: (1) receive a command from another device via the one or more antennas; (2) determine whether the command was intended for the electronic tag (e.g., based on a unique ID of the electronic device); (3) in accordance with a determination that the command was intended for the electronic tag, operate in accordance with the command; and (4) in accordance with a determination that the command was not intended for the electronic tag, disregard the command.

In some implementations, the command comprises a command to enable radar communication, and wherein the first controller operating in accordance with the command comprises the first controller communicating the enablement command to the second controller. In some implementations, the command includes a recipient identification, and wherein the first controller determining whether the command was intended for the electronic tag comprises comparing the recipient identification with an identification of the electronic tag. In some implementations, the command is encrypted, and wherein the first controller is further configured to decrypt the command.

In some implementations, the first circuit further includes a decoder configured to decode signals received via the one or more antennas. In some implementations, the decoder is further configured to decrypt commands. In some implementations, the decoder is further configured to determine whether the command was intended for the electronic device. In some implementations, the decoder is a component of the first controller. In some implementations, the second controller is further configured to encrypt information sent via the one or more second antennas.

In some implementations, the electronic tag includes an energy storage circuit coupled to the first circuit and the second circuit and configured to provide power to the first circuit and the second circuit.

In some implementations, the energy storage circuit includes at least one of: (i) one or more capacitors; (ii) one or more batteries; (iii) circuitry configured to harvest energy from signals received via an antenna of the electronic tag (e.g., one of the one or more antennas, one of the one or more second antennas, or a third antenna dedicated to harvesting); and (iv) circuitry configured to harvest thermal, vibrational, electromagnetic, and/or solar energy received by the electronic tag.

In some implementations, the second controller is further configured to selectively enable radar communication via the one or more second antennas comprising at least one of: (i) reflecting received radio waves (e.g., at a given wavelength); (ii) amplifying received radio waves; (iii) modulating received radio waves; and (iv) generating radio waves. In some implementations, the second controller is configured to enable radar communication in response to receiving an enablement command from the first controller.

In some implementations, the second circuit further includes a modulator configured to modulate radio waves received via the one or more second antennas. In some implementations, the second circuit further includes a signal generator configured to generate radio waves at a particular frequency.

In some implementations, the electronic tag further includes one or more additional sensors coupled to the first controller, the one or more additional sensors including at least one of: a humidity sensor; a temperature sensor; an accelerometer; a gyroscope; and an optical sensor.

In some implementations, the first circuit is configured to transmit tag information via the one or more antennas (e.g., tag state information such as battery life, sensor readings, etc.). In some implementations, the second circuit is configured to transmit tag information via the one or more second antennas (eg, tag state information such as battery life, sensor readings, etc.).

In some implementations, the electronic tag comprises a passive tag, such as a corner reflector or printed radar tag. In some implementations, passive tags modulate an incoming radio signal. The modulated incoming signal is reflected back toward the transmitting device (e.g., control device 1000). In some implementations, the signal is modulated such that when the radar system analyzes the reflected signal the tag appears to be moving at a particular speed.

Figure 10D:
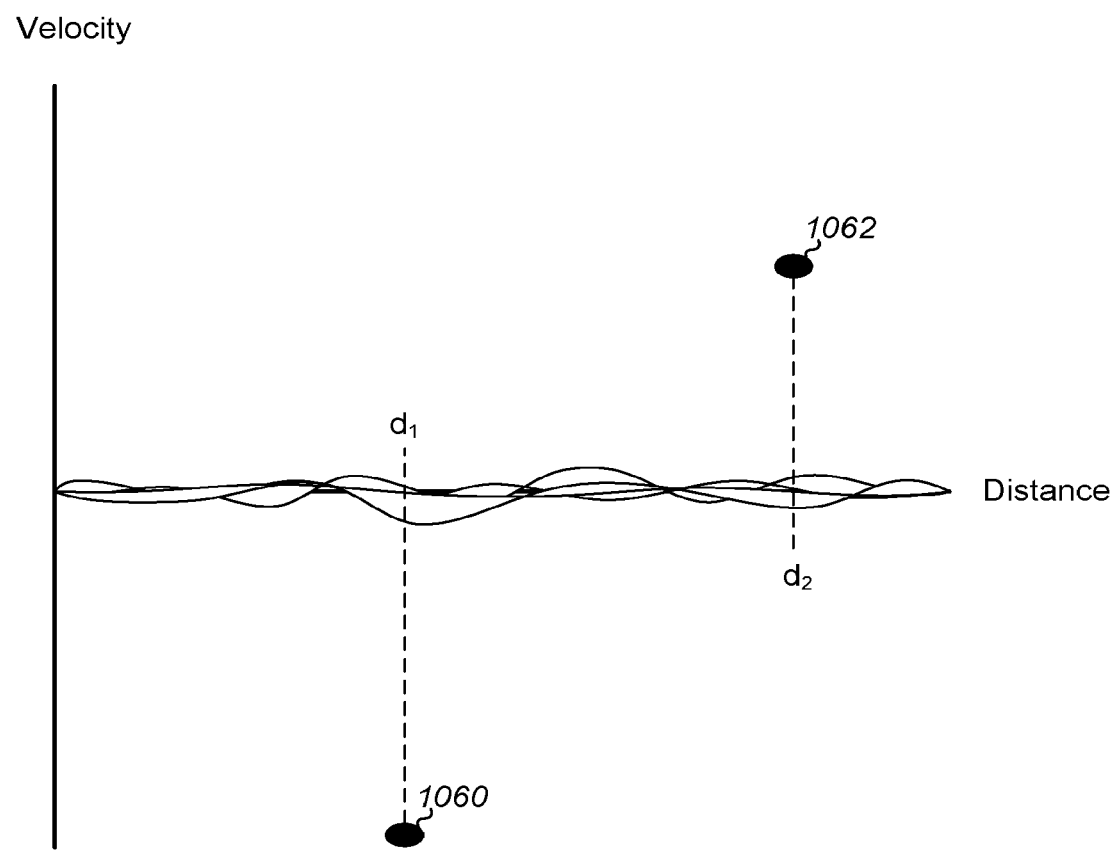
FIG. 10D is a prophetic diagram of radar data, in accordance with some implementations.

FIG. 10D is a prophetic diagram of radar data, in accordance with some implementations. FIG. 10D shows detected velocities of various objects based on received radar data. In FIG. 10D most of the detected objects are either stationary or have little velocity. Two objects, object 1060 and object 1062, are detected with high velocities. The detected object 1060 is detected a distance di with a large negative velocity indicating that it is moving away from the radar device. The detected object 1062 is detected at a distance $d_2$ with a large positive velocity indicating that it is moving toward the radar device.

In accordance with some implementations, the detected objects 1060 and 1062 represent passive radar tags. The passive radar tags are configured to modulate incoming radio waves such that they appear to be moving with high velocity even when the tag itself is stationary. The apparent velocity of the radar tag due to the modulation is sometimes called a phantom velocity. Each radar tag is optionally configured such that its modulation produces a distinct phantom velocity. In some implementations, the radar device determines that the velocities of objects 1060 and 1062 are phantom velocities based on the value of each velocity. For example, a radar-equipped device installed within a smart home environment detects an object with a velocity of 30 miles per hour. Since objects within the smart home generally do not move at such high velocities, the radar-equipped device determines that the velocity is a phantom velocity and the object is a radar tag. In some implementations, the radar-equipped device determines that the velocities of objects 1060 and 1062 are phantom velocities based on the constant location of the objects. For example, a radar-equipped device performs a first scan and detects the object 1060 at distance di with an apparently high velocity. The radar-equipped device performs a second scan at a later time and again detects the object 1060 at distance di. Because the object 1060 is at the same distance in both scans the velocity is determined to be a phantom velocity. In some implementations, the radar-equipped device stores a list of radar tag information with each tag's expected distance and/or expected phantom velocity (e.g., obtained during a registration process for the radar tags). In some implementations, the radar-equipped device compares the list of radar tag information with the detected results to identify any detected tags.

In some implementations, a radar tag is affixed to an object such as a door or window. In some instances, the object to which the device is affixed is in motion during a radar scan. In these circumstances, the detected velocity of the radar tag includes both a phantom velocity due to the modulation of the radio signal and an actual velocity of the object to which the radar tag is attached. In some implementations, the radar-equipped device identifies the actual velocity component and associates it with the object to which the radar tag is affixed. For example, the radar tag is affixed to a door and the radar-equipped device determines that the radar tag is moving 1 inch per second. In this example, the radar-equipped device associates the 1 inch per second movement with the door and optionally alerts a user of the smart home environment that movement of the door has been detected. In some implementations, the radar-equipped device identifies the actual velocity component based on the radar tag's detected distance (e.g., detected distance over a period of time). In some implementations, the radar-equipped device identifies the actual velocity component based on an expected phantom velocity for the radar tag.

In some implementations, a radar tag is configured such that it optionally selectively modulates incoming radio waves to exhibit one of a plurality of different phantom velocities. For example, a particular radar tag may be configured to operate in a first state where it exhibits a phantom velocity of 10 miles per hour; operate in a second state where it exhibits a phantom velocity of 15 miles per hour; or operate in a third state where it exhibits a phantom velocity of 20 miles per hour. In some implementations, the operating state of the radar tag is governed by a control device, such as control device 1000. In some implementations, the operating state of the radar tag is configured during a registration process.

In some implementations, a method is performed at a computing system having one or more processors and memory (e.g., control device 1000). The method comprises (1) sending a request via a first transmitter to enable a remote radar device (e.g., electronic tag 1002-1); and (2) in response to the request, receiving via a radar receiver a radio communication from the radar device.

In some implementations, the method further comprises: (1) obtaining identification for the remote radar device; and (2) encrypting the identification; where sending the request comprises sending the encrypted identification.

In some implementations, the method further comprises, after receiving the radio communication from the radar device, sending a request via the first transmitter to enable a second remote radar device.

In some implementations, the method further comprises, after receiving the radio communication from the radar device, sending a request via the first transmitter to disable radio communication by the radar device (e.g., to prevent interference with communication by a second radar device).

In some implementations, the method further comprises: (1) prior to sending the request, receiving a registration request for the remote radar device; and (2) in response to receiving the registration request, determining a location of the remote radar device.

In some implementations, determining the location of the remote radar device comprises determining the location of the remote radar device based on the received radio communication.

In some implementations, the registration request is received via an application (e.g., an application on a mobile device).

In some implementations, the registration request includes information regarding an object to which the remote radar device is affixed (e.g., attached to a door, window, wall, or the like).

In some implementations, the computing system comprises a smart device (e.g., smart device 204).

In some implementations, the smart device comprises one of: a thermostat; a camera; a hub device; a hazard detector; an irrigation device; media playback device; entryway interface device; appliance; or a security device.

In some implementations, the radio communication comprises at least one of: (i) a reflection of a radio signal transmitted by the computing device; (ii) a modulation of a radio signal transmitted by the computing device; and (iii) a radio signal generated at the remote radar device (e.g., a tone or pulse).

In some implementations, the radio communication includes information regarding operation of the remote radar device (e.g., sensor readout information).

In some implementations, the method further comprises receiving via a first receiver, communications from the radar device (e.g., status information).

In some implementations, a method performed at an electronic device (e.g., electronic tag 1002-1), comprises: (1) receiving, via a first receiver, an enablement request from a remote device (e.g., control device 1000); (2) determining whether the enablement request was intended for the electronic device; (3) in accordance with a determination that the enablement request was not intended for the electronic device, disregarding the enablement request; and (4) in accordance with a determination that the enablement request was intended for the electronic device, communicating with the remote device via radar.

In some implementations, the enablement request is encrypted, and the method further comprises decrypting the enablement request.

In some implementations, determining whether the enablement request was intended for the electronic device comprises comparing an identification of the electronic device to identification in the enablement request.

In some implementations, the enablement request includes timing information for communicating with the remote device via radar, and the method further comprises communicating with the remote device via radar in accordance with the received timing information (e.g., send pulse every minute, hour, or day).

In some implementations, the method further comprises encrypting information to be sent via to the remote device, and communicating with the remote device via radar comprises communicating the encrypted information.

In some implementations, the method further comprises: (1) storing energy received via one or more antennas of the electronic device; and (2) utilizing the stored energy to communicate with the remote device via radar.

In some implementations, communicating with the remote device via radar includes at least one of: reflecting received radio waves; amplifying received radio waves; modulating received radio waves; and generating radio waves.

Figure 11A:
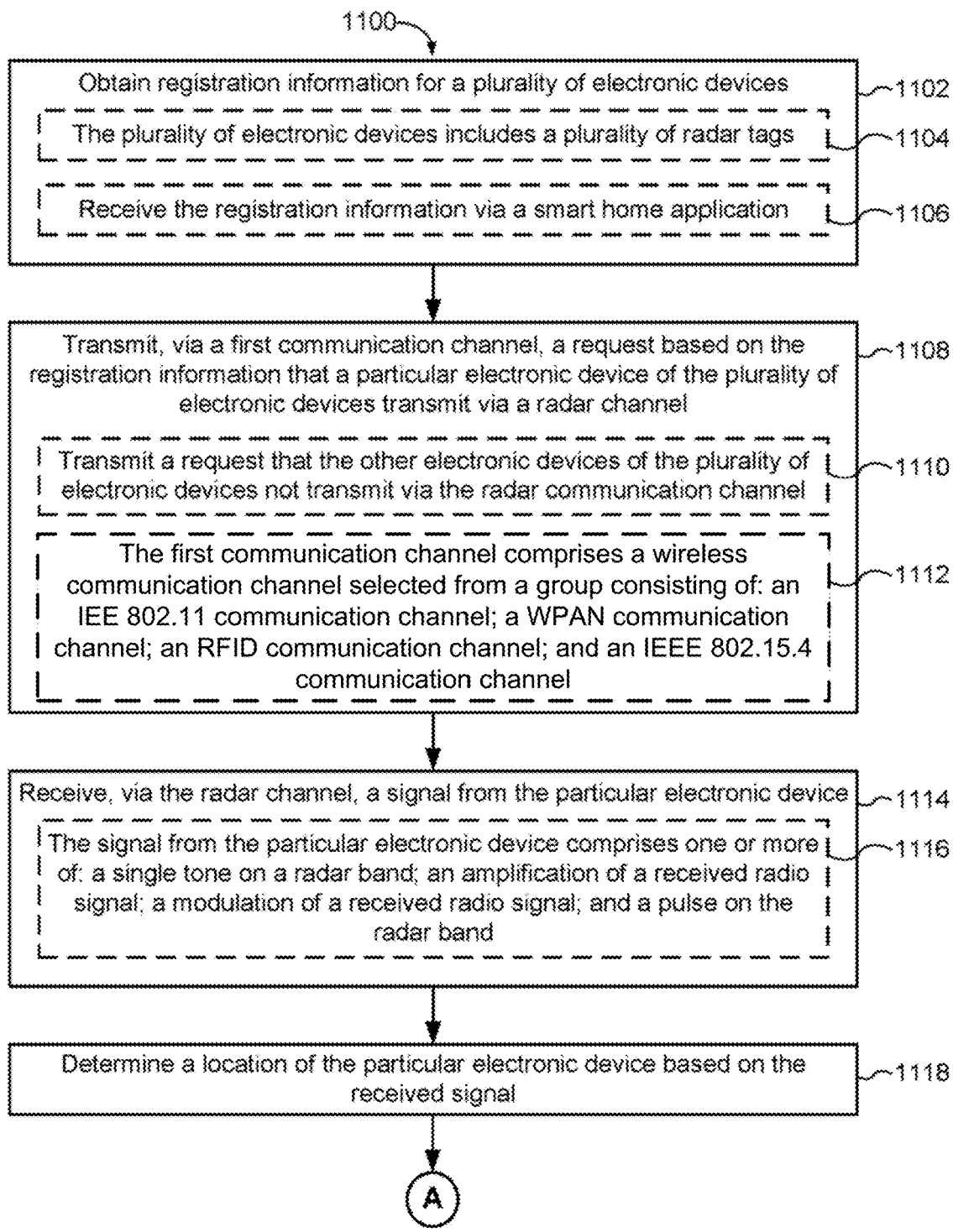
FIGS. 11A-11C are flowcharts illustrating a method for utilizing radar communications, in accordance with some implementations.
Figure 11B:
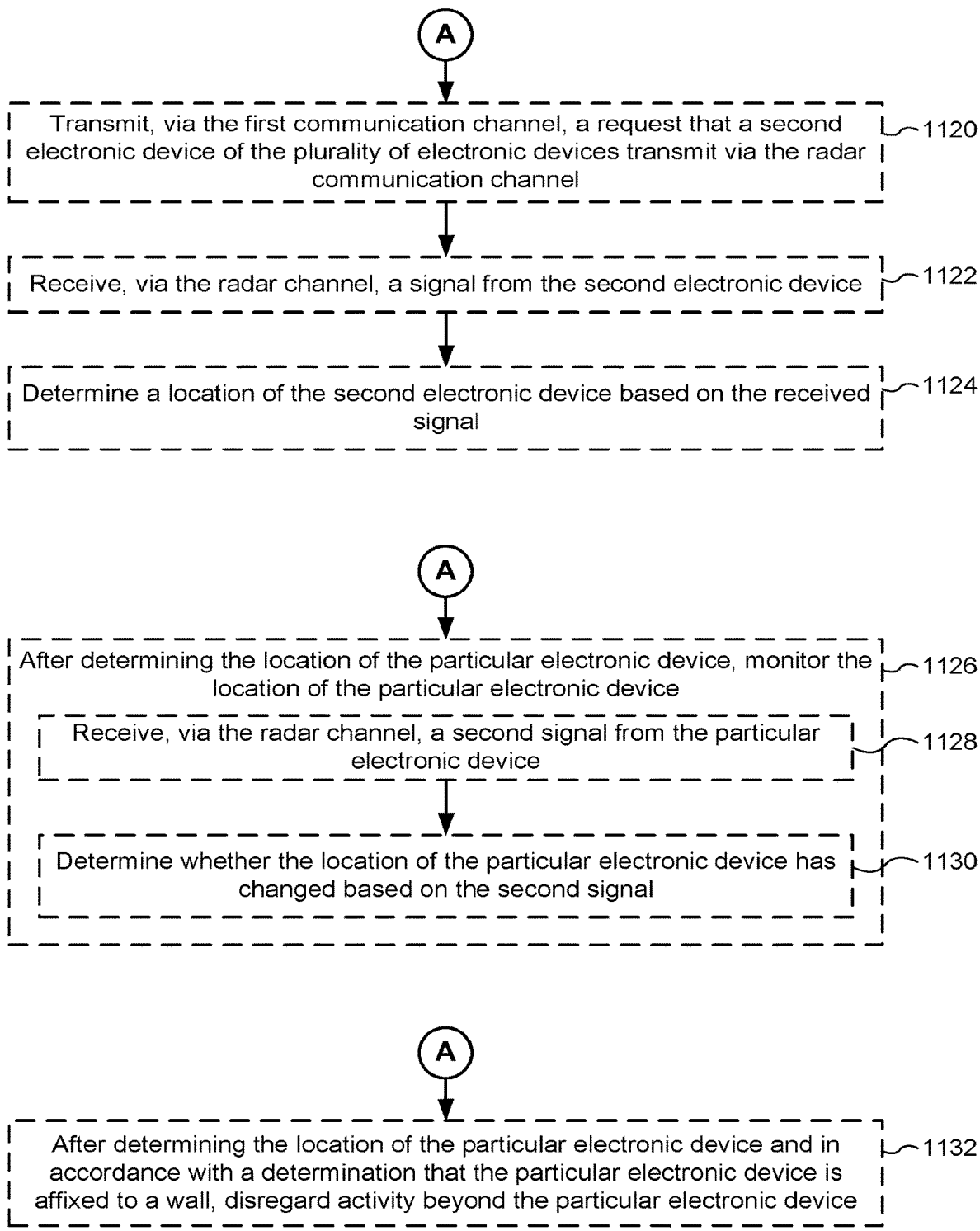
Figure 11C:
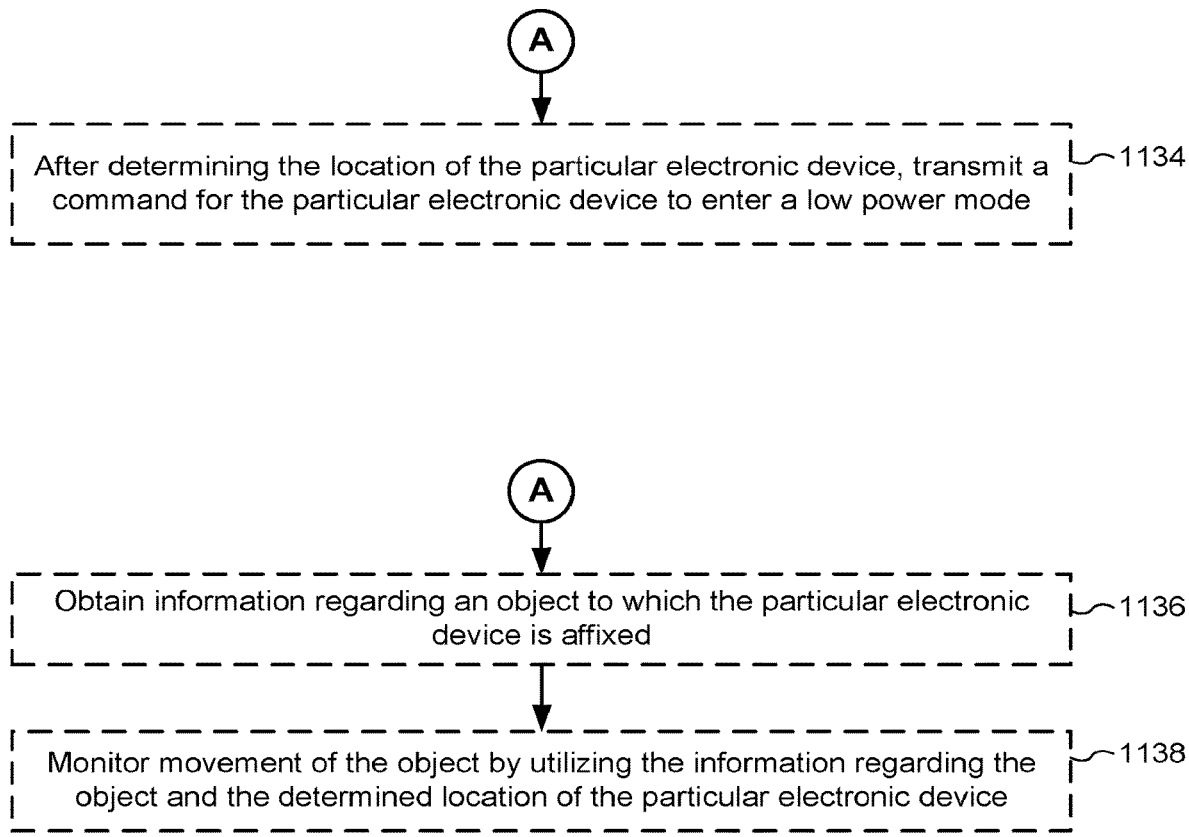
Figure 12:
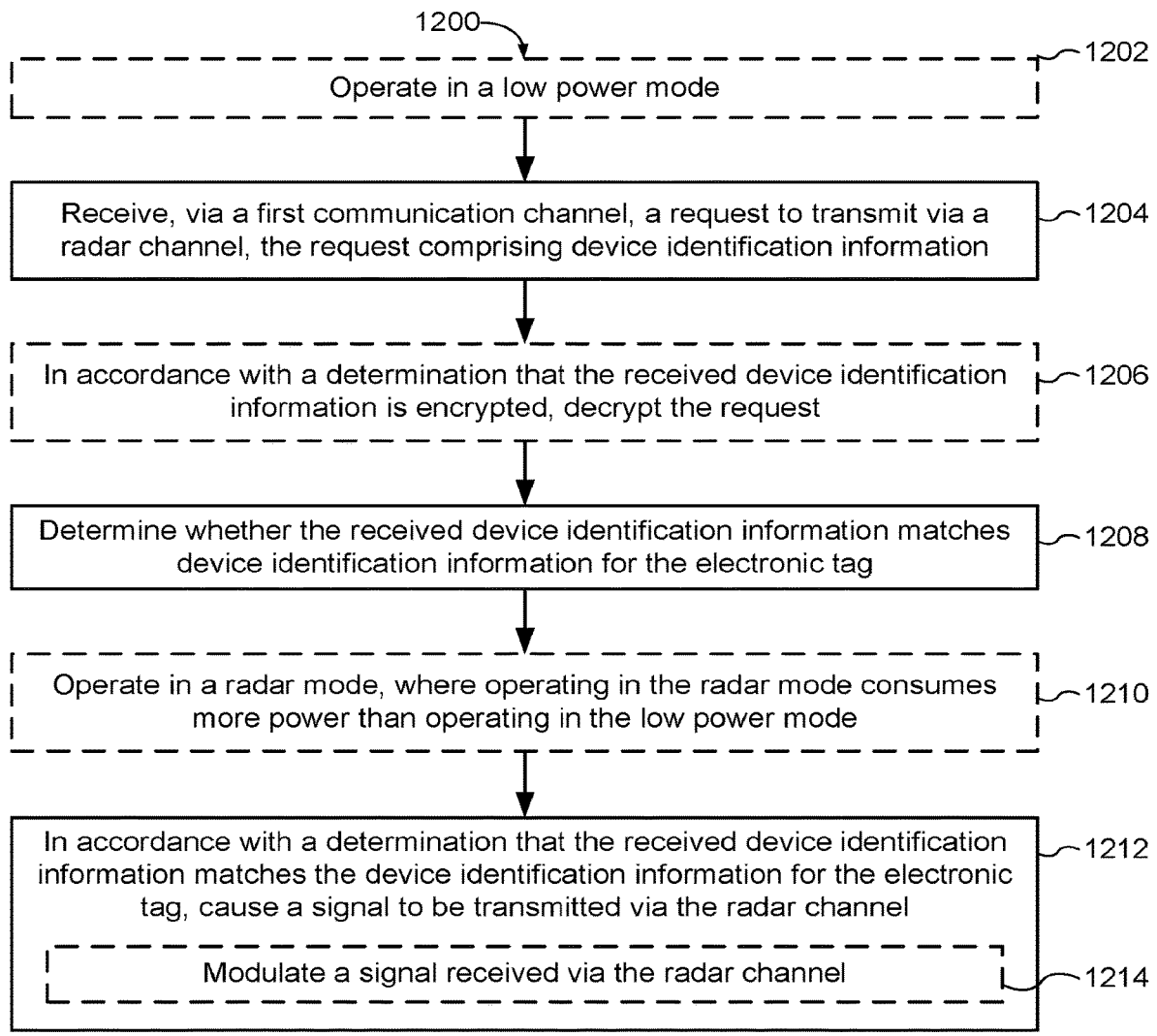
FIG. 12 is a flowchart illustrating another method for utilizing radar communications, in accordance with some implementations.

Attention is now directed to the flowchart representations of FIGS. 11A-11C and 12. FIGS. 11A-11C are flowcharts illustrating a method 1100 for utilizing radar communications, in accordance with some implementations. FIG. 12 is a flowchart illustrating a method 1200 for utilizing radar communications at an electronic tag, in accordance with some implementations.

In some implementations, the method 1100 is performed by: (1) one or more electronic devices of one or more systems, such as the devices of a smart home environment 100, FIG. 1; (2) one or more computing systems, such as smart home provider server system 164 of FIG. 1 and/or server system 508 of FIG. 5; or (3) a combination thereof. In some implementations, the method 1100 is governed by instructions that are stored in a non-transitory computer readable storage medium and that are executed by one or more processors of a device/computing system, such as the one or more CPU(s) 602 of hub device 180 (FIG. 6) and/or the one or more CPU(s) 902 of smart device 204 (FIG. 9A). For convenience, the operations detailed below are described as being performed by a computing system.

The computing system (e.g., control device 1000, FIG. 10C) obtains (1102) registration information for a plurality of electronic devices. In some implementations, the computing system comprises a smart device selected from a group consisting of: a camera; a hub device; a smart thermostat; a smart security device; an entryway interface device; and a smart hazard detector. In some implementations, the registration information for each electronic device includes a unique identifier of the device. In some implementations, the registration information includes one or more of: (1) information regarding the owner of the device; (2) the location, positioning, and/or placement of the device; (3) an intended purpose of the device (e.g., specified by the device owner); and (4) operating parameters of the device. In some implementations, the registration information includes the electronic device's expected distance and/or expected phantom velocity with regards to the computing system.

In some implementations, the plurality of electronic devices includes (1104) a plurality of radar tags (also sometimes called electronic tags). For example, in accordance with some implementations, the plurality of electronic devices includes one or more electronic tags 1002 (FIG. 10A)

In some implementations, the computing system receives (1106) the registration information via a smart home application (e.g., installed on a smart phone). In some implementations, the registration information is obtained by scanning a QR code on the electronic devices (e.g., with a smart phone). In some implementations, the information from the QR code and, optionally, additional information, such as information regarding what type of object the device is affixed to, is then relayed to the computing system. In some implementations, a pull-tab and scan method is used to obtain the registration information. In some implementations, an activation button and scan method is used.

In some implementations, the computing system obtains device identification information for the plurality of electronic devices. In some implementations, the device identification information includes information regarding what type of object the device is affixed to.

The computing system transmits (1108), via a first communication channel, a request based on the registration information that a particular electronic device of the plurality of electronic devices transmit via a radar channel (also sometimes called a radar communications channel or a radar positioning channel). For example, in accordance with some implementations, the smart device 204 in FIG. 9A transmits the request utilizing communications module 942 in conjunction with device communication module 922. In some implementations, transmitting the request via the first communication channel comprises transmitting an enable signal with a device identification of the particular electronic device. For example, the computing system transmits a request that only the particular device (identified in the request) utilize the radar channel during a particular time window. In some implementations, each electronic device has a unique identifier, and in response to the enablement signal each device compares its unique identifier to a transmitted identifier in the request. In some implementations, the communicating via the radar channel comprises utilizing frequency modulated continuous wave (FMCW) radar, phase modulated continuous wave (PMCW) radar, step continuous wave radar, or the like.

In some implementations, the computing system broadcasts, via a standard wireless communication protocol, a request based on the device identification information that a particular electronic device of the plurality of electronic devices be enabled to transmit or reflect location information using a radar technique. In some implementations, the standard wireless communication protocol comprises a Wi-Fi® protocol, a Bluetooth® protocol, an RFID protocol, an IEEE 802.15.4 protocol, or the like. In some implementations, broadcasting the request comprises concurrently transmitting the request to all electronic devices within signal range. In some implementations, the radar technique comprises analyzing time-of-flight, analyzing phase shift, analyzing amplitude, and/or analyzing Doppler frequency shift(s).

In some implementations, the computing system transmits (1110) a request that the other electronic devices of the plurality of electronic devices not transmit via the radar communication channel. In some implementations, the computing system transmits separate requests to each device requesting that the device transmit, or not, during a particular time window.

In some implementations, the computing system transmits a single request to transmit with a device identifier included. Each electronic device compares its identifier to the included identifier, and if the identifiers match the electronic device determines that it should transmit during the time window. If the identifiers do not match, the electronic device determines that it should not transmit during the time window.

In some implementations, the computing device transmits a radar schedule to the plurality of the electronic devices. The radar schedule includes a time window for each electronic device to transmit via the radar channel. In some implementations, the computing device ensures that only one electronic device is transmitting on the radar channel at a given time. In some implementations, the computing device directs multiple electronic devices to transmit concurrently. For example, each electronic device outputs a distinct radar signal (e.g., a distinct phantom velocity) and the computing device is configured to determine which received signal came from which device.

In some implementations, the first communication channel comprises (1112) a wireless communication channel selected from a group consisting of: a Wi-Fi® communication channel; a Bluetooth® communication channel; an RFID communication channel; and an IEEE 802.15.4 communication channel.

The computing system receives (1314), via the radar channel, a signal from the particular electronic device (e.g., comprising positioning information). For example, in accordance with some implementations, the smart device 204 in FIG. 9A receives the signal from the particular electronic device utilizing communications module 942 in conjunction with radio communication module 924 and/or radar module 944.

In some implementations, the computing system receives a signal from the particular electronic device, the signal indicating a location of the particular electronic device using a radar technique. In some implementations, the radar technique comprises analyzing time-of-flight, analyzing phase shift, analyzing amplitude, and/or analyzing Doppler frequency shift(s).

In some implementations, the signal from the particular electronic device comprises (1316) one or more of: a single tone on a radar band (e.g., a frequency band designated for radar communications); an amplification of a received radio signal; a modulation of a received radio signal; and a pulse on the radar band. In some implementations, the particular electronic device transmits the single tone for a predetermined amount of time. The computing device receives this tone and extrapolates positioning and movement information for the electronic device. In some implementations, the particular electronic device transmits the single tone until the computing system transmits a stop command. In some implementations, after the computing system extrapolates positioning and/or movement information from the received signal, the computing system transmits a request to the particular electronic device to cease transmitting via the radar channel.

The computing system determines (1318) the location of the particular electronic device based on the received signal. In some implementations, the particular electronic device outputs a phantom velocity and the computing system determines the location of the electronic device by comparing the received phantom velocity with a registered phantom velocity for the particular electronic device. In some implementations, the computing system determines a location and/or movement of the particular electronic device by comparing parameters in the received signal with parameters previously received from the particular electronic device (e.g., received during a prior radar transmission or received during registration).

In some implementations, the computing system transmits (1320), via the first communication channel, a request that a second electronic device of the plurality of electronic devices transmit via the radar communication channel. In some implementations, the computing system transmits the request to the second electronic device concurrently with the request for the particular electronic device. In some implementations, the computing system transmits the request to the second electronic device after receiving a response from the particular electronic device to the request directed to the particular electronic device. In some implementations, the computing system receives (1322), via the radar channel, a signal from the second electronic device. In some implementations, the computing system determines (1324) a location of the second electronic device based on the received signal. In some implementations, the computing system cycles through the plurality of electronic device to determine the location and/or movement of each electronic device in turn. In some implementations, the computing system concurrently determines the location and/or movement of at least a subset of the electronic device.

In some implementations, after determining the location of the particular electronic device, the computing system monitors (1326) the location of the particular electronic device. For example, the computing system periodically sends requests to the electronic device to transmit via the radar channel. The computing system receives responses from the electronic device and extrapolates location and/or movement information from the responses to monitor the location of the particular electronic device. In some implementations, the particular electronic device is configured to periodically transmit via the radar channel. In some implementations, the particular electronic device is configured to transmit via the radar channel in response to certain stimuli, such as motion of the particular electronic device (eg, detected via an accelerator on the electronic device), or changes in temperature, lighting, and/or humidity.

In some implementations, the computing system receives (1328), via the radar channel, a second signal from the particular electronic device. In some implementations, the computing system determines (1330) whether the location of the particular electronic device has changed based on the second signal. In some implementations, monitoring the location of the particular electronic device comprises receiving information from the particular electronic device at preset intervals. In some implementations, monitoring the location of the particular electronic device comprises using the first communication channel to request that the particular electronic device transmit via the radar channel (e.g., at preset intervals, or in response to activity in the vicinity). In some implementations, the second signal is in response to a second request or a transmitted radio signal (e.g., is an amplification/modulation of the radio signal).

In some implementations, after determining the location of the particular electronic device and in accordance with a determination that the particular electronic device is affixed to a wall, the computing system disregards (1332) activity beyond the particular electronic device. For example, the particular electronic device is affixed to a wall separating two apartments and the computing device forgoes monitoring activity in the apartment beyond the wall. In accordance with some implementations, the control device 1000 in FIG. 10A disregards activity beyond the wall to which electronic tag 1002-1 is affixed.

In some implementations, after determining the location of the particular electronic device, the computing system transmits (1334) a command for the particular electronic device to enter a low power mode. In some implementations, the particular device does not transmit via the radar channel while in the low power mode. In some implementations, the particular device includes radar circuitry (e.g., radar circuitry 913, FIG. 9B) and the radar circuitry is not powered (or not fully powered) while in low power mode.

In some implementations, the computing system obtains (1336) information regarding an object (e.g., a door, wall, ceiling, or window) to which the particular electronic device is affixed. In some implementations, the computing system obtains (1336) information regarding an entity (e.g., a person, animal, or pet) to which the particular electronic device is affixed. In some implementations, the computing system obtains the information during registration of the particular electronic device. For example, during a registration process, a user of the electronic device specifies an object or entity to which the particular electronic tag is attached.

In some implementations, the computing system monitors (1338) movement of the object by utilizing the information regarding the object (or entity) and the determined location of the particular electronic device. In some implementations, the electronic tag is assigned a tag type based on the object to which it is affixed. For example, a tag affixed to a wall is denoted as a wall tag, and radar information beyond the tag is optionally disregarded, and a tag affixed to a window is denoted as an entryway tag. In some implementations, the electronic tag's operating mode is based at least in part on the assigned type. For example, in accordance with some implementations, an electronic tag assigned to a door operates in an entryway monitoring mode. While in the entryway monitoring mode, the electronic tag generates a signal on the radar channel in response to motion of the electronic tag. In this example, a second electronic tag is assigned to a household pet and operates in a pet mode. While in the pet mode, the electronic tag generates a signal on the radar channel in response to only specific types of motion (or a lack of motion). In some implementations, the tag type is assigned via a smart home application. For example, a user of the electronic tag denotes the tag as having a particular type within the smart home application on the user's smart phone.

In some implementations, the computing device includes an electronic device configured to communicate with an electronic tag, comprising: (1) a first circuit configured to communicate with the electronic tag at a first frequency; and (2) a radar circuit configured to transmit and receive radio signals.

In some implementations, the electronic device comprises at least one of: a thermostat; a camera; a hub device; a hazard detector; an irrigation device; media playback device; entryway interface device; appliance; and a security device.

In some implementations, the method 1200 is performed by an electronic tag (e.g., electronic tag 206, FIG. 9B). In some implementations, the method 1200 is governed by instructions that are stored in a non-transitory computer readable storage medium and that are executed by one or more processors of an electronic tag, such as controller 911 of electronic tag 206 (FIG. 9B). For convenience, the operations detailed below are described as being performed by an electronic tag.

In some implementations, an electronic tag operates (1202) in a low power mode. In some implementations, operating in the low power mode comprises powering off and/or disabling radar circuitry (e.g., radar circuitry 913). In some implementations, the electronic tag operates in a low power mode prior to receiving a request directed to the electronic tag (e.g., from a control device 1000, FIG. 10A). In some implementations, the electronic tag operates in the low power mode after responding to a request.

The electronic tag receives (1204), via a first communication channel, a request to transmit via a radar channel, the request comprising device identification information. For example, in accordance with some implementations, the electronic tag 206 in FIG. 9B receives the request via communication circuitry 903. In some implementations, the device identification information is received via a second request (e.g., sent in conjunction with the request to transmit). In some implementations, the device identification information is formatted into the request.

In some implementations, the electronic tag receives, via a standard wireless communication protocol, a request from an electronic device to be enabled to transmit or reflect location information using a radar technique, the request including device identification information. In some implementations, the standard wireless communication protocol comprises a Wi-Fi® protocol, a Bluetooth® protocol, an RFID protocol, an IEEE 802.15.4 protocol, or the like. In some implementations, the radar technique comprises analyzing time-of-flight, analyzing phase shift, analyzing amplitude, and/or analyzing Doppler frequency shift(s).

In some implementations, in accordance with a determination that the received device identification information is encrypted, the electronic tag decrypts (1206) the request. In some implementations, the request is encrypted and the electronic tag decrypts the request utilizing a decoder (e.g., decoder 907). In some implementations, the encryption comprises the device identification information.

The electronic tag determines (1208) whether the received device identification information matches device identification information for the electronic tag. In some implementations, the device identification information for the electronic tag is stored at the tag. For example, in accordance with some implementations, the electronic tag 206 in FIG. 9B stores device identification information within decoder 907 (e.g., hard-coded within the electronic tag).

In some implementations, after determining that the received device identification information matches the device identification information for the electronic tag, the electronic tag operates (1210) in a radar mode, where operating in the radar mode consumes more power than operating in the low power mode. In some implementations, the electronic tag operates in the radar mode in accordance with a determination that the received device identification information matches the device identification information for the electronic tag. In some implementations, operating in the radar mode comprises powering the radar circuitry (e.g., radar circuitry 913). In some implementations, operating in the radar mode comprises operating the radar circuitry (e.g., transmitting a signal utilizing the radar circuitry).

In some implementations, in accordance with a determination that the received device identification information does not match the device identification information for the electronic tag, the electronic tag disregards the request. In some implementations, in accordance with a determination that the received device identification information does not match the device identification information for the electronic tag, the electronic tag forgoes transmitting via the radar channel during a particular time window (e.g., a time window specified in the request).

The electronic tag, in accordance with a determination that the received device identification information matches the device identification information for the electronic tag, causes (1212) a signal to be transmitted via the radar channel. In some implementations, causing a signal to be transmitted includes generating and transmitting a preset phantom velocity (e.g., a phantom velocity 1060 or 1062, FIG. 10D).

In some implementations, in accordance with a determination that the received device identification information matches the device identification information for the electronic tag, the electronic tag causes a signal to be transmitted, the signal indicating the location of the electronic tag using a radar technique. In some implementations, the radar technique comprises analyzing time-of-flight, analyzing phase shift, analyzing amplitude, and/or analyzing Doppler frequency shift(s). In some implementations, causing the signal to be transmitted includes transmitting a preset phantom velocity (e.g., a phantom velocity 1060 or 1062, FIG. 10D). In some implementations, causing the signal to be transmitted includes modulating and reflecting an incoming radio signal such that a preset phantom velocity is present in the reflected signal.

In some implementations, the electronic tag modulates (1214) a signal received via the radar channel (e.g., a signal originating at a control device, such as control device 1000). In some implementations, transmitting the signal via the radar channel comprises modulating a signal received via the radar channel. In some implementations, transmitting the signal via the radar channel comprises amplifying a received signal. In some implementations, transmitting the signal via the radar channel comprises transmitting a tone or pulse with a preset frequency and/or duration.

In some implementations, the electronic tag includes: (1) a first circuit (e.g., communication circuitry 903) configured to communicate with one or more other devices via a first communications channel, the first circuit including: (a) one or more antennas (e.g., receiver 905) configured to communicate at a first frequency corresponding to the first communications channel; and (b) a first controller (e.g., controller 911) coupled to the one or more antennas, the first controller configured to govern the one or more antennas; and (2) a second circuit (e.g., radar circuitry 913) configured to communicate with the one or more other devices via radar, the second circuit including: (a) one or more second antennas (e.g., receiver 915 and/or transmitter 917) configured to communicate via radar; and (b) a second controller (e.g., controller 919) coupled to the one or more second antennas and the first controller, the second controller configured to communicate with the first controller and to govern the one or more second antennas.

In some implementations, the first controller is configured to: (1) receive a command from another device (e.g., controller device 1000) via the one or more antennas; (2) determine whether the command was intended for the electronic tag; (3) in accordance with a determination that the command was intended for the electronic tag, operate in accordance with the command; and (4) in accordance with a determination that the command was not intended for the electronic tag, disregard the command.

In some implementations, the command comprises a command to enable radar communication, and wherein the first controller operating in accordance with the command comprises the first controller communicating an enablement command to the second controller.

In some implementations, the command includes a recipient identification, and wherein the first controller determining whether the command was intended for the electronic tag comprises comparing the recipient identification with an identification of the electronic tag.

In some implementations, the command is encrypted, and the first controller is further configured to decrypt the command. In some implementations, the first circuit further includes a decoder configured to decode and/or decrypt signals received via the one or more antennas. In some implementations, the second controller is further configured to encrypt information sent via the one or more second antennas.

In some implementations, the electronic tag further includes an energy storage circuit coupled to the first circuit and the second circuit and configured to provide power to the first circuit and the second circuit. In some implementations, the energy storage circuit includes at least one of: (1) one or more capacitors; (2) one or more batteries; (3) circuitry configured to harvest energy from signals received via an antenna of the electronic tag; and (4) circuitry configured to harvest thermal, vibrational, electromagnetic, and/or solar energy received by the electronic tag.

In some implementations, the second controller is further configured to selectively enable radar communication via the one or more second antennas, the radar communication comprising at least one of: (1) reflecting received radio waves; (2) amplifying received radio waves; (3) modulating received radio waves; and (4) generating radio waves. In some implementations, the second circuit further includes a modulator configured to modulate radio waves received via the one or more second antennas. In some implementations, the second circuit further includes a signal generator configured to generate radio waves at a particular frequency.

In some implementations, the electronic tag further includes one or more additional sensors coupled to the first controller, the one or more additional sensors including at least one of: a humidity sensor; a temperature sensor; an accelerometer; a gyroscope; and an optical sensor.

In some implementations, the first circuit is configured to transmit tag information via the one or more antennas. In some implementations, the second circuit is configured to transmit tag information via the one or more second antennas.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first type of signal could be termed a second type of signal, and, similarly, a second type of signal could be termed a first type of signal, without departing from the scope of the various described implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for determining information associated with an electronic device, comprising:
   obtaining, by a hub device, device identification information for the electronic device;
   transmitting, by the hub device, via a close-range wireless communication protocol for direct device-to-device communication, a request that the electronic device enable radar circuitry of the electronic device, wherein the request comprises the device identification information;
   receiving, by the hub device, a radar signal from the radar circuitry of the electronic device; and
   determining, from the received radar signal, a distance, a direction, or both, from the hub device to the electronic device.

2. The method for determining information associated with the electronic device of claim 1, wherein the hub device receives the radar signal from the radar circuitry of the electronic device in response to the radar circuitry being enabled based on the request.

3. The method for determining information associated with the electronic device of claim 1, further comprising:
   transmitting, by the hub device, an initial radar signal to the electronic device, wherein the initial radar signal is modulated by the radar circuitry of the electronic device and transmitted to the hub device as the radar signal in response to receiving the initial radar signal.

4. The method for determining information associated with the electronic device of claim 1, further comprising:
   comparing the determined distance, direction, or both, from the hub device to the electronic device with a predefined boundary around the hub device;
   determining, based on the comparison with the predefined boundary, that the electronic device is outside the predefined boundary; and
   generating an alert indicating that the electronic device is outside the predefined boundary.

5. The method for determining information associated with the electronic device of claim 1, wherein the radar signal is transmitted by the radar circuitry of the electronic device, and the electronic device disables the radar circuitry after transmitting the radar signal.

6. The method for determining information associated with the electronic device of claim 1, further comprising:
receiving, by the hub device, a second radar signal from the radar circuitry of the electronic device; and
determining, from the second radar signal, whether the distance, the direction, or both, from the hub device to the electronic device has changed.

7. The method for determining information associated with the electronic device of claim 1, further comprising:
transmitting, by the hub device, via the close-range wireless communication protocol, a second request that a second electronic device enable radar circuitry of the second electronic device, wherein the request comprises second device identification information for the second electronic device;
receiving, by the hub device, a second radar signal from the radar circuitry of the second electronic device; and
determining, from the second radar signal, a second distance, a second direction, or both, from the hub device to the second electronic device.

8. The method for determining information associated with the electronic device of claim 1, wherein the request further comprises instructions that cause the electronic device to enable the radar circuitry of the electronic device to transmit the radar signal at predefined time intervals.

9. The method for determining information associated with the electronic device of claim 1, wherein the hub device receives the radar signal from the radar circuitry of the electronic device in response to detecting movement of the electronic device.

10. The method for determining information associated with the electronic device of claim 1, further comprising:
adjusting, by the hub device and in response to determining the distance, the direction, or both from the hub device to the electronic device, a setting of a smart home environment.

11. A system comprising:
an electronic device comprising:
communication circuitry configured to receive requests via a close-range wireless communication protocol for direct device-to-device communication;
radar circuitry configured to transmit a radar signal; and
a controller configured to enable and disable the radar circuitry based on requests received by the communication circuitry; and
a hub device configured to:
obtain device identification information associated with the electronic device;
transmit, via the close-range wireless communication protocol, a request that the electronic device enable the radar circuitry of the electronic device, wherein the request comprises the device identification information;
receive the radar signal from the radar circuitry of the electronic device; and
determine, from the received radar signal, a distance, a direction, or both from the hub device to the electronic device.

12. The system of claim 11, further comprising an application executed on a mobile device, the application configured to provide the device identification information to the hub device.

13. The system of claim 11, further comprising a plurality of electronic devices, the plurality of electronic devices comprising the electronic device, wherein the hub device is further configured to:
receive respective radar signals from each of the plurality of electronic devices; and
determine, from each respective radar signal, respective distances, directions, or both, from the hub device to each of the plurality of electronic devices.

14. The system of claim 11, further comprising a smart home environment, the smart home environment comprising the hub device, the electronic device, and one or more smart appliances, wherein the hub device is further configured to adjust one or more settings associated with the smart home environment based on the determined distance, direction, or both, from the hub device to the electronic device.

15. The system of claim 11, further comprising a smart home provider server system, wherein the hub device is further configured to transmit information regarding the received radar signal to the smart home provider server system for additional data processing.

16. A method for determining information associated with an electronic device, comprising:
obtaining, by a control device, device identification information for the electronic device;
broadcasting, by the control device, via a wireless communication protocol operating according to the Institute of Electrical and Electronics Engineers (IEEE) 802.11 standard, a request that the electronic device enable radar circuitry of the electronic device and transmit a radar signal using the radar circuitry, wherein the request comprises the device identification information;
receiving, by the control device, the requested radar signal transmitted by the radar circuitry of the electronic device; and
determining, from the received radar signal, a distance, a direction, or both, from the control device to the electronic device.

17. The method for determining information associated with the electronic device of claim 16, wherein the electronic device enables the radar circuitry of the electronic device in response to a determination that the request comprises the device identification information for the electronic device.

18. The method for determining information associated with the electronic device of claim 16, wherein the request is broadcast to a plurality of electronic devices comprising the electronic device, and the request further comprises a request that others of the plurality of electronic devices not enable respective radar circuitry.

19. The method for determining information associated with the electronic device of claim 16, further comprising:
broadcasting, by the control device, via the wireless communication protocol, a second request that a second electronic device enable radar circuitry of the second electronic device and transmit a second radar signal using the radar circuitry of the second electronic device, wherein the request comprises second device identification information for the second electronic device;
receiving, by the control device, the second radar signal transmitted by the radar circuitry of the second electronic device; and
determining, from the second radar signal, a second distance, a second direction, or both, from the control device to the second electronic device.

20. The method for determining information associated with the electronic device of claim 16, further comprising:
- receiving, by the control device, a second radar signal transmitted by the radar circuitry of the electronic device;
- determining, from the second radar signal, that the distance, direction, or both, from the control device to the electronic device has changed; and
- generating an alert indicating that the distance, direction, or both, from the control device to the electronic device has changed.

* * * * *